(12) United States Patent
Mori et al.

(10) Patent No.: US 12,451,699 B2
(45) Date of Patent: Oct. 21, 2025

(54) ENERGY SUPPLY PLAN FORMULATION DEVICE AND ENERGY SUPPLY PLAN FORMULATION METHOD

(71) Applicant: Mitsubishi Electric Corporation, Tokyo (JP)

(72) Inventors: Hiroyuki Mori, Tokyo (JP); Hiroshi Maitani, Tokyo (JP); Yoshito Nishita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 378 days.

(21) Appl. No.: 18/008,670

(22) PCT Filed: Jul. 15, 2020

(86) PCT No.: PCT/JP2020/027444
§ 371 (c)(1),
(2) Date: Dec. 7, 2022

(87) PCT Pub. No.: WO2022/013959
PCT Pub. Date: Jan. 20, 2022

(65) Prior Publication Data
US 2023/0246444 A1  Aug. 3, 2023

(51) Int. Cl.
*H02J 3/28* (2006.01)
(52) U.S. Cl.
CPC ........................................ *H02J 3/28* (2013.01)
(58) Field of Classification Search
None
See application file for complete search history.

(56) References Cited

U.S. PATENT DOCUMENTS

2016/0043548 A1 * 2/2016 Bozchalui ................. H02J 3/28
                                                          700/291
2016/0233676 A1 * 8/2016 Bosch .................. G05B 13/026
(Continued)

FOREIGN PATENT DOCUMENTS

CN    110569562 A    12/2019
CN    110601174 A    12/2019
(Continued)

OTHER PUBLICATIONS

International Search Report and Written Opinion mailed on Sep. 29, 2020, received for PCT Application PCT/JP2020/027444, filed on Jul. 15, 2020, 8 pages including English Translation.
(Continued)

*Primary Examiner* — Sean Shechtman
(74) *Attorney, Agent, or Firm* — XSENSUS LLP

(57) ABSTRACT

It is intended to reduce errors related to an energy supply plan to be formulated. An energy supply plan formulation device includes an acquisition unit for acquiring a change of a base load of energy equipment, a determination unit for determining whether to need correction of at least one of an equipment model and a load model on the basis of the change of the base load, a correction unit for correcting at least one of the equipment model and the load model on the basis of a determination result, a demand forecasting unit for forecasting the amount of energy demand, and a supply plan formulation unit for formulating an energy supply plan on the basis of the equipment model and the amount of energy demand.

15 Claims, 16 Drawing Sheets

(56) References Cited

U.S. PATENT DOCUMENTS

| | | |
|---|---|---|
| 2018/0046158 A1 | 2/2018 | Saito et al. |
| 2021/0286922 A1 | 9/2021 | Obara et al. |

FOREIGN PATENT DOCUMENTS

| | | |
|---|---|---|
| JP | 2009-115386 A | 5/2009 |
| JP | 2016-170715 A | 9/2016 |
| JP | 2018-128995 A | 8/2018 |

OTHER PUBLICATIONS

Office Action issued Jun. 14, 2025 in corresponding Chinese patent application No. 202080102825.8 (22 pages; with English machine translation).

* cited by examiner

F I G. 1
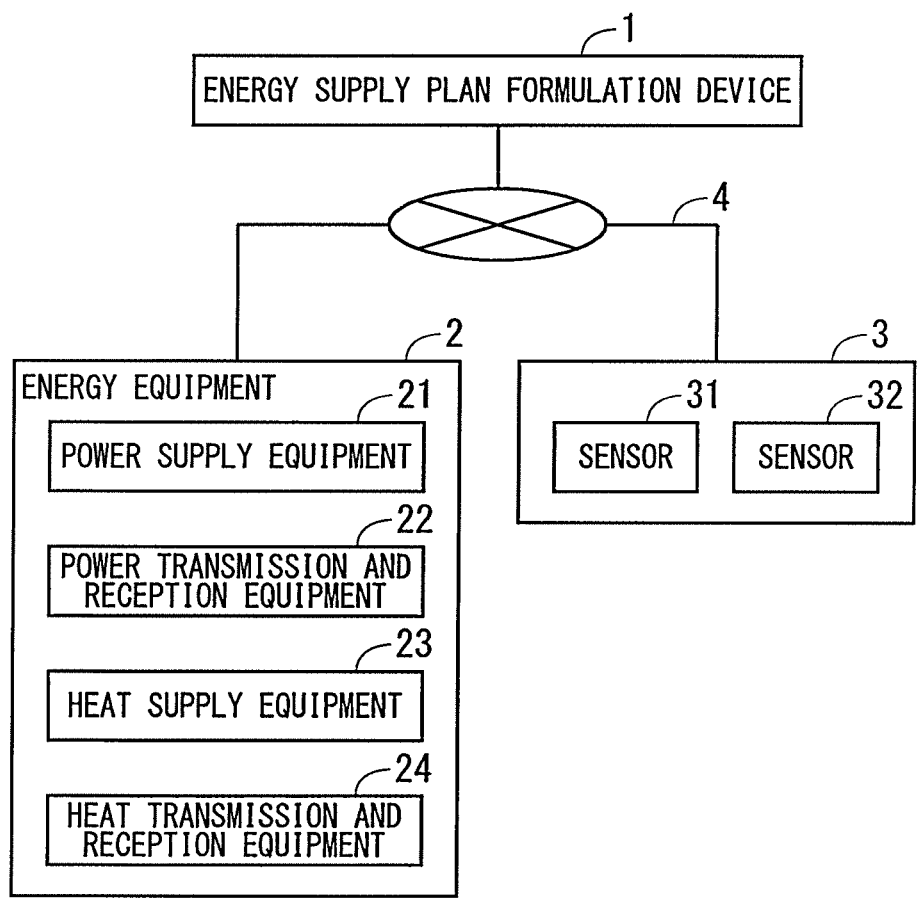
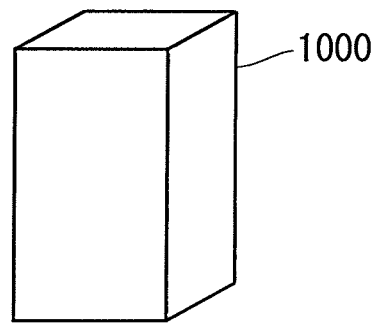

FIG. 3

| VARIABLE 2 \ VARIABLE 1 | $x_1$ | ... | $x_n$ |
|---|---|---|---|
| $y_1$ | Parameter$_{11}$ | ... | Parameter$_{n1}$ |
| ⋮ | ⋮ | ⋱ | ⋮ |
| $y_m$ | Parameter$_{1m}$ | ... | Parameter$_{nm}$ |

F I G. 7
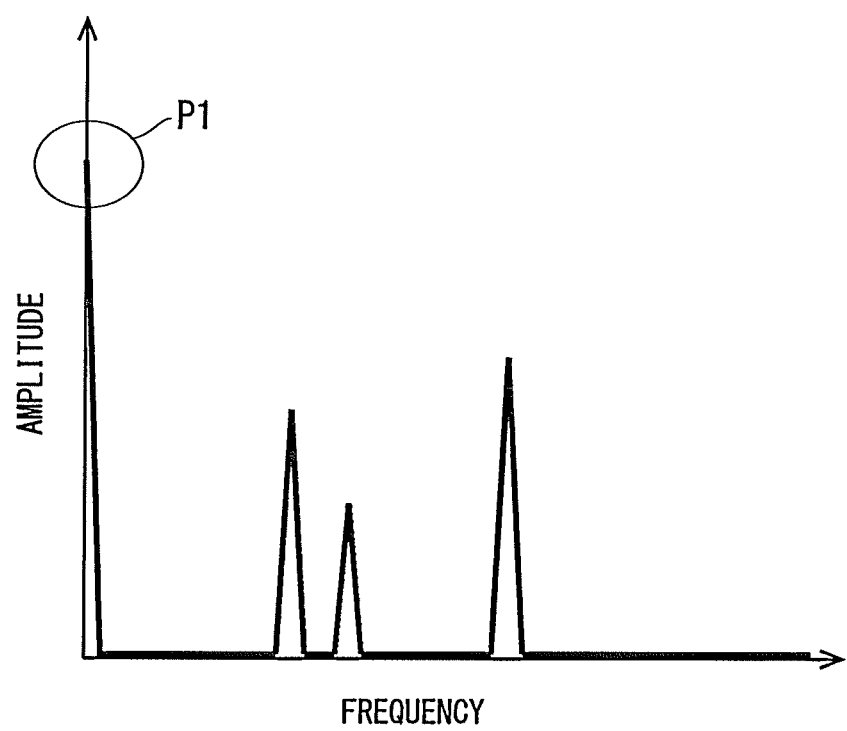

F I G. 1 3
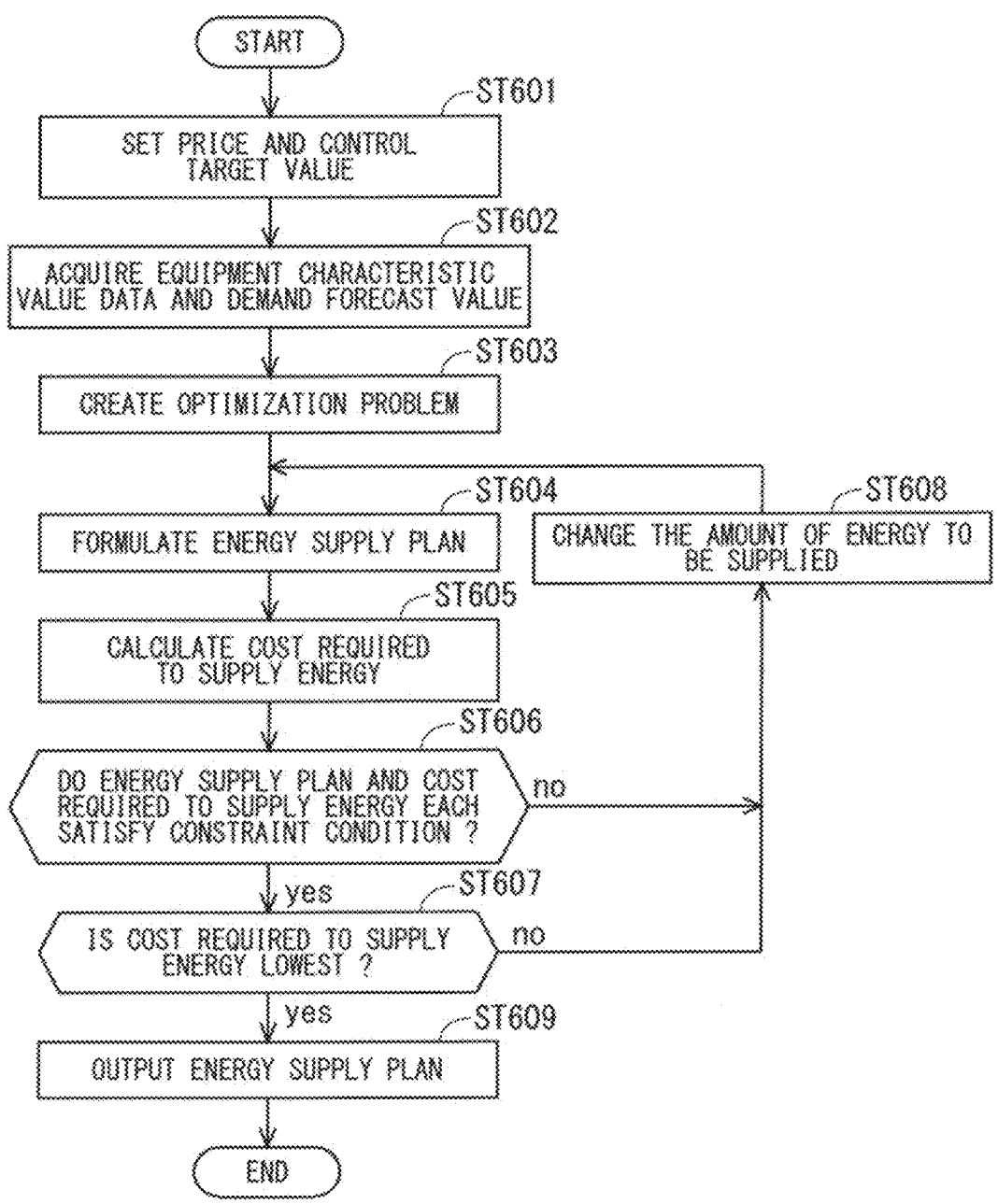

F I G. 1 5
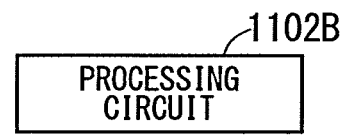

ENERGY SUPPLY PLAN FORMULATION DEVICE AND ENERGY SUPPLY PLAN FORMULATION METHOD

CROSS-REFERENCE TO RELATED APPLICATION

The present application is based on PCT filing PCT/JP2020/027444, filed Jul. 15, 2020, the entire contents of which are incorporated herein by reference.

TECHNICAL FIELD

The technique disclosed in the specification of the present application relates to an energy supply plan formulation device and an energy supply plan formulation method.

BACKGROUND ART

For the purpose of efficiently exploiting energy resources and reducing energy cost, a cogeneration-type energy supply system has been developed, which uses a plurality of energy equipment in cooperation, including power supply equipment such as solar photovoltaics (PV) or the like, power transmission and reception equipment such as storage battery or the like, heat supply equipment such as a chiller, EcoCute, or the like, or heat transmission and reception equipment such as a heat storage tank or the like, to thereby supply heat and power to a facility such as a building or the like (see, for example, Patent Document 1, 2, or 3, or the like).

PRIOR ART DOCUMENTS

Patent Document(s)

[Patent Document 1] Japanese Patent Application Laid Open Gazette No. 2009-115386
[Patent Document 2] Japanese Patent Application Laid Open Gazette No. 2018-128995
[Patent Document 3] Japanese Patent Application Laid Open Gazette No.

SUMMARY

Problem to be Solved by the Invention

In Patent Documents 1 and 2, for example, an equipment model which can be used for formulating an energy supply plan by the operation of energy equipment. No function of correcting the equipment model, however, is disclosed.

On the other hand, in Patent Document 3, it is determined whether to need correction of such an equipment model as described above. Since the determination on the necessity of correction is based on whether or not the polarity of a coefficient is the same as that of a user setting or another model of the same type of equipment, however, the equipment characteristics of the energy equipment, serving as a base load thereof, cannot be considered, and when there occurs a characteristic change accompanying a change of the equipment configuration or performance degradation of the equipment, the forecast accuracy cannot be assured.

This causes an error in load forecast performed in formulating an energy supply plan and further causes an error in the formulated energy supply plan. Then, there arises a problem that there may be a case where efficient exploitation of energy resources or reduction of energy cost cannot be achieved.

The technique disclosed in the specification of the present application is intended to solve the above-described problem, and it is an object of the technique to reduce errors related to an energy supply plan to be formulated.

Means to Solve the Problem

An energy supply plan formulation device according to a first aspect of the technique disclosed in the specification of the present application is an energy supply plan formulation device for formulating an energy supply plan to be used for controlling an operation of at least one energy equipment which inputs and/or outputs energy from/to an energy supply target, on the basis of an equipment model corresponding to the energy equipment and a load model corresponding to the energy supply target, and in the energy supply plan formulation device, the equipment model is data indicating energy input/output characteristics of the corresponding energy equipment, and the load model is a physical formula or an arithmetic operation method used for forecasting the amount of energy demand of the corresponding energy supply target. The energy supply plan formulation device includes an acquisition unit for acquiring a change of a base load of the energy equipment, a determination unit for determining whether to need correction of at least one of the equipment model and the load model on the basis of the change of the base load, a correction unit for correcting at least one of the equipment model and the load model on the basis of a determination result of the determination unit, a demand forecasting unit for forecasting the amount of energy demand of the energy supply target, and a supply plan formulation unit for formulating an energy supply plan on the basis of the equipment model and the amount of energy demand.

An energy supply plan formulation method according to a second aspect of the technique disclosed in the specification of the present application is an energy supply plan formulation method for formulating an energy supply plan to be used for controlling an operation of at least one energy equipment which inputs and/or outputs energy from/to an energy supply target, on the basis of an equipment model corresponding to the energy equipment and an load model corresponding to the energy supply target, and in the energy supply plan formulation method, the equipment model is data indicating energy input/output characteristics of the corresponding energy equipment, and the load model is a physical formula or an arithmetic operation method used for forecasting the amount of energy demand of the corresponding energy supply target. The energy supply plan formulation method includes the operations of acquiring a change of a base load of the energy equipment, determining whether to need correction of at least one of the equipment model and the load model on the basis of the change of the base load, correcting at least one of the equipment model and the load model on the basis of a determination result, forecasting the amount of energy demand of the energy supply target, and formulating an energy supply plan on the basis of the equipment model and the amount of energy demand.

Effects of the Invention

According to at least the first and second aspects of the technique disclosed in the specification of the present application, it is possible to correct the model in response to the change of the base load of the energy equipment and further formulate an energy supply plan on the basis of the model. For this reason, it is possible to reduce errors related to the energy supply plan.

These and other objects, features, aspects and advantages of the technique disclosed in the specification of the present application will become more apparent from the following detailed description when taken in conjunction with the accompanying drawings.

BRIEF DESCRIPTION OF DRAWINGS

FIG. 1 is a view conceptually showing an exemplary configuration of a cogeneration-type energy supply system including an energy supply plan formulation device in accordance with a preferred embodiment;

FIG. 3 is a view showing an exemplary table representing parameters of an equipment model in accordance with the preferred embodiment;

FIG. 7 is a graph showing an exemplary extraction of a frequency component in accordance with the preferred embodiment;

FIG. 13 is a flowchart showing an exemplary processing flow of a supply plan formulation unit in accordance with the preferred embodiment;

FIG. 15 is a view schematically illustrating another hardware configuration in a case of actually operating the energy supply plan formulation device exemplarily shown in FIGS. 2 and 5.

DESCRIPTION OF EMBODIMENT(S)

Hereinafter, the preferred embodiment will be described with reference to attached figures. In the preferred embodiment described below, though detailed features and the like will be shown for description of the technique, these are illustratively shown and all the features are not always necessary in order for the preferred embodiment to be achieved.

Furthermore, figures are schematically shown, and for convenience of illustration, omission of some constituent elements or simplification of a structure will be made in the figures as appropriate. Further, the correlation in the size and position of a structure or the like shown in different figures is not always represented accurately but may be changed as appropriate. Even in figures other than a cross section, such as a plan view or the like, hatching is made in some cases for easy understanding of the contents in the preferred embodiment.

Further, in the following description, identical constituent elements are represented by the same reference signs and each have the same name and function. Therefore, detailed description thereof will be omitted in some cases for avoiding duplication.

Further, in the following description, when there is a description that something "comprises", "includes", "has", or the like a constituent element, this description is not such an exclusive expression as indicating that there is no other constituent element, unless otherwise noted.

Conceptual Configuration of Energy Supply Plan Formulation Device

Figure 16:
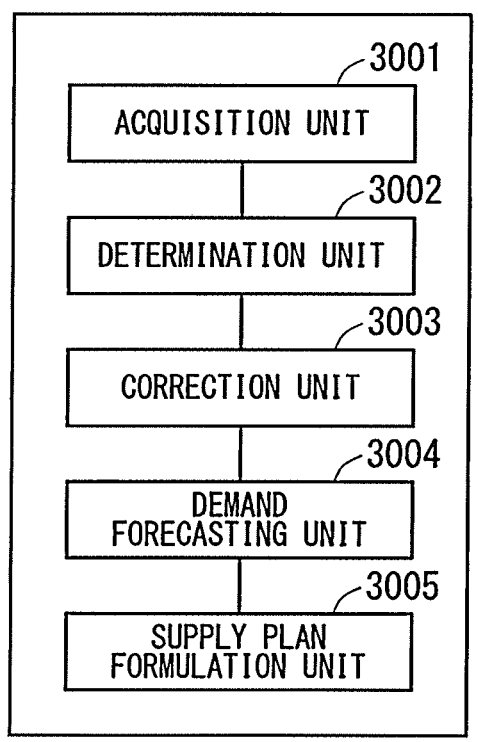
FIG. 16 is a view conceptually showing an exemplary configuration (functional units) of the energy supply plan formulation device in accordance with the present preferred embodiment.

FIG. 16 is a view conceptually showing an exemplary configuration (functional units) of an energy supply plan formulation device in accordance with the present preferred embodiment.

The energy supply plan formulation device which is conceptually shown in FIG. 16 is an energy supply plan formulation device for formulating an energy supply plan to be used for controlling an operation of at least one energy equipment which inputs and/or outputs energy from/to an energy supply target, on the basis of an equipment model corresponding to the energy equipment and a load model corresponding to the energy supply target.

As illustrated in FIG. 16, the energy supply plan formulation device includes an acquisition unit 3001, a determination unit 3002, a correction unit 3003, a demand forecasting unit 3004, and a supply plan formulation unit 3005.

Herein, the equipment model is data indicating energy input/output characteristics of the corresponding energy equipment. Further, the load model is a physical formula or an arithmetic operation method used for forecasting the amount of energy demand of the corresponding energy supply target.

The acquisition unit 3001 acquires a change of a base load of the energy equipment. The determination unit 3002 determines whether to need correction of at least one of the equipment model and the load model on the basis of the change of the base load.

The correction unit 3003 corrects at least one of the equipment model and the load model on the basis of a determination result of the determination unit. The demand forecasting unit 3004 forecasts the amount of energy demand of the energy supply target. The supply plan formulation unit 3005 formulates an energy supply plan on the basis of the equipment model and the amount of energy demand.

Constituent elements shown in the following preferred embodiment with reference to the drawings or the like more specifically show the above-described exemplary configuration shown in FIG. 16.

The Preferred Embodiment

Hereinafter, an energy supply plan formulation device and an energy supply plan formulation method in accordance with the present preferred embodiment will be described.

Configuration of Energy Supply Plan Formulation Device

FIG. 1 is a view conceptually showing an exemplary configuration of a cogeneration-type energy supply system including an energy supply plan formulation device 1 in accordance with the present preferred embodiment. As exemplarily shown in FIG. 1, the energy supply plan formulation device 1 is connected to energy equipment 2 and a sensor 3 through a control network 4. Herein, the energy supply plan formulation device 1 is a device for controlling an operation of the energy equipment 2.

The energy equipment 2 is a constituent element of an energy supply system, which is equipment for supplying energy to a building 1000 that is an energy supply target or for stocking (i.e., storing) the energy to be supplied.

The energy equipment 2 includes power supply equipment 21 such as a private power generator or the like for supplying power to the building 1000 or the like, power transmission and reception equipment 22 such as storage battery or the like which stores and discharges power, heat supply equipment 23 such as a chiller or the like for supplying heat, and heat transmission and reception equipment 24 such as a heat storage tank or the like which stores and discharges heat. Further, the configuration of the energy equipment 2 and the number of energy equipment 2 are not limited to the exemplary case shown in FIG. 1.

The sensor 3 is a sensor for measuring a physical quantity and constituted of one or more sensors (sensors 31 and 32 in FIG. 1) or the like. The sensor 3 is, for example, a sensor for measuring a temperature, a humidity, the amount of solar radiation, or the like as indoors-and-outdoors environment data, to thereby acquire the corresponding data. Further, the sensor 3 may be incorporated in the energy equipment 2. Furthermore, the data acquired by the sensor 3 may include data on weather forecast or the like which are acquired through the internet or the like.

The control network 4 is a communication network for connecting the energy supply plan formulation device 1, the energy equipment 2, and the sensor 3 to one another.

Figure 2:
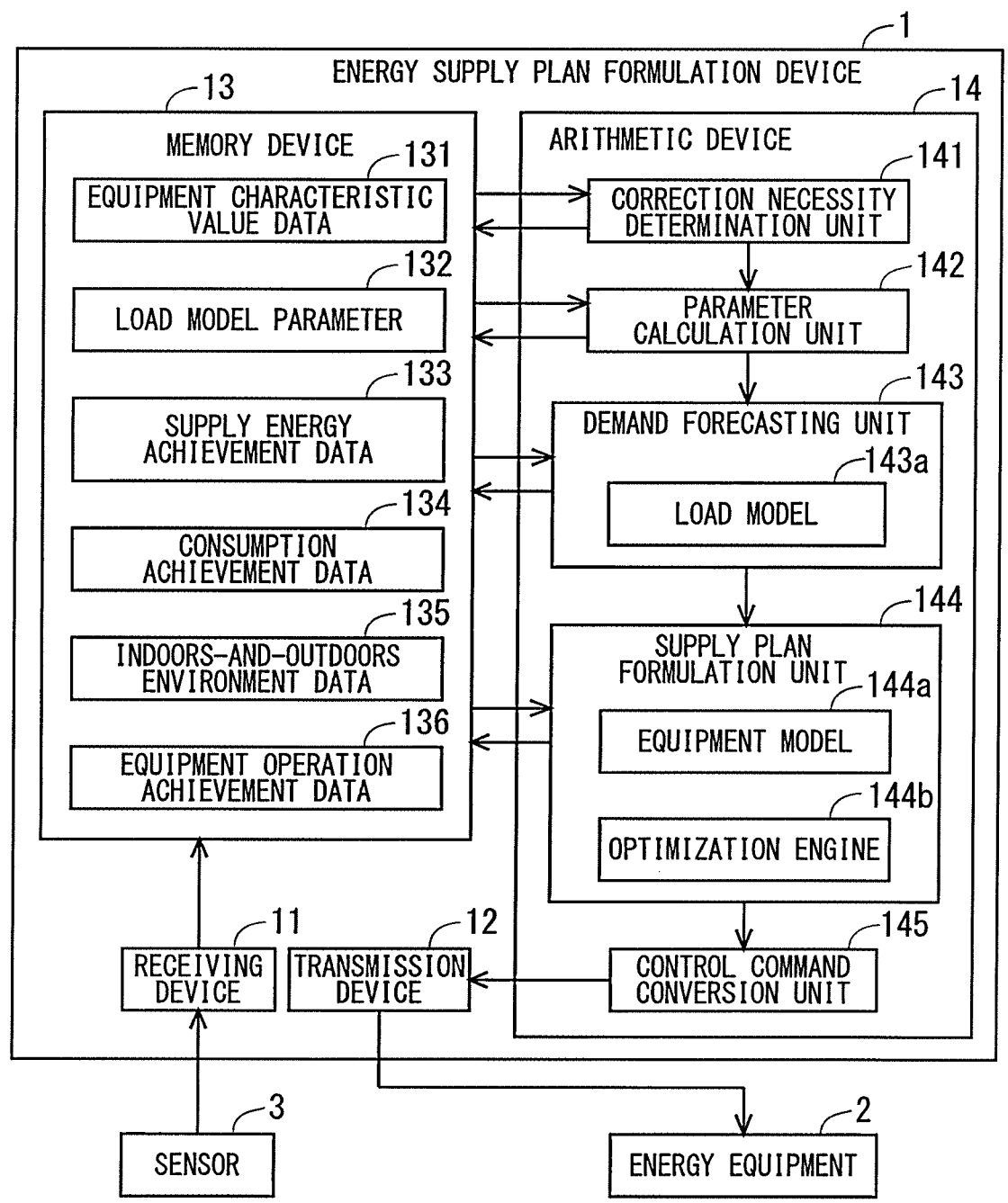
FIG. 2 is a view showing an exemplary configuration of the energy supply plan formulation device in accordance with the preferred embodiment.

FIG. 2 is a view showing an exemplary configuration of the energy supply plan formulation device 1 in accordance with the present preferred embodiment. As exemplarily shown in FIG. 2, the energy supply plan formulation device 1 includes a receiving device 11, a transmission device 12, a memory device 13, and an arithmetic device 14. As described above, the energy supply plan formulation device 1 exemplarily shown in FIG. 2 is a device for controlling an operation of the energy equipment 2.

The receiving device 11 acquires data from the energy equipment 2 and the sensor 3 at a predetermined time interval (for example, 5-minute interval). Then, the receiving device 11 stores the acquired data in the memory device 13. Further, the time interval for data acquisition from the energy equipment 2 and the time interval for data acquisition from the sensor 3 may be different from each other.

The transmission device 12 is a device for transmitting a control command to the energy equipment 2. The memory device 13 stores therein at least equipment characteristic value data 131, load model parameter 132, supply energy achievement data 133, consumption achievement data 134, indoors-and-outdoors environment data 135, and equipment operation achievement data 136.

The equipment characteristic value data 131 are data on a characteristic value (parameter) of an equipment model 144a which a supply plan formulation unit 144 has. The equipment model 144a is data indicating energy input/output characteristics of the energy equipment 2 used as a target on a table or a graph. The equipment model 144a is referred to in formulating the energy supply plan and used to determine the amount of energy input and output in the energy equipment 2 as the target. The equipment model 144a is, for example, a relation between a cold/hot water outlet temperature and an outside air temperature, and a coefficient of performance (COP) in the chiller which is a kind of the energy equipment 2.

The load model parameter 132 is data on a parameter of a load model 143a which a later-described demand forecasting unit 143 has. The load model 143a is a physical formula or an arithmetic operation method used for forecasting the amount of energy demand in the building 1000, and uses the load model parameter 132 in order to forecast the amount of energy demand. The load model parameter 132 is, for example, a heat transmission coefficient of a wall surface which is skeleton information of the building 1000.

The supply energy achievement data 133 are data indicating the amount of energy at each time point which each energy equipment 2 supplied in the past from the current time. Further, the length of the retention period of the supply energy achievement data 133 from the past is not particularly limited. The supply energy achievement data 133 may be data of the amount of energy supply which is directly measured by the sensor 3 or may be data of the amount of energy supply calculated from other relevant data.

The consumption achievement data 134 are data indicating the amount of power or the amount of fuel at each time point which each energy equipment 2 consumed in the past from the current time. Further, the length of the retention period of the consumption achievement data 134 from the past is not particularly limited. The consumption achievement data 134 may be data of the amount of consumption which is directly measured by the sensor 3 or may be data of the amount of consumption calculated from other relevant data.

The indoors-and-outdoors environment data 135 are data indicating the temperature, the humidity, the amount of solar radiation, or the like around or inside the building 1000, which is measured by the sensor 3. The indoors-and-outdoors environment data 135 may include the data on weather forecast or the like which are acquired through the internet or the like. The length of the retention period of the indoors-and-outdoors environment data 135 from the past and the length of the forecast period of the indoors-and-outdoors environment data 135 from the next day are not particularly limited.

The equipment operation achievement data 136 are data indicating an equipment state at each time point in operating each energy equipment 2 in the past from the current time. The equipment operation achievement data 136 indicate, for example, a cold/hot water inlet/outlet temperature or a cold/hot water flow rate of the chiller which is a kind of the energy equipment 2. Further, the length of the retention period of the equipment operation achievement data 136 from the past is not particularly limited.

The arithmetic device 14 includes a correction necessity determination unit 141, a parameter calculation unit 142, a demand forecasting unit 143, a supply plan formulation unit 144, and a control command conversion unit 145.

The correction necessity determination unit 141 determines whether to need to correct the equipment characteristic value data 131 and the load model parameter 132 by using other data. When the characteristic of energy supply in the building 1000 is changed due to degradation of the equipment, a change of the configuration, or the like, the correction necessity determination unit 141 determines that it is necessary to correct either of (or both) the equipment model 144a and the load model 143a. Further, details of the correction necessity determination unit 141 will be described later.

The parameter calculation unit 142 performs an arithmetic operation to correct the parameter of either of (or both) the equipment model 144a and the load model 143a which is determined by the correction necessity determination unit 141, to need to be corrected. Then, the parameter calculation unit 142 newly stores and updates the parameter which is obtained as the arithmetic result in the memory device 13, to thereby correct either of (or both) the equipment model 144a and the load model 143a. Further, details of the parameter calculation unit 142 will be described later.

The demand forecasting unit 143 forecasts the amount of energy demand in the building 1000 by using the load model 143a on the basis of the data acquired from the memory device 13. The load model 143a is the physical formula or the arithmetic operation method used for forecasting the amount of energy demand in the building 1000 as described above, and the load model parameter 132 is used to forecast the amount of energy demand. Further, details of the demand forecasting unit 143 will be described later.

The supply plan formulation unit 144 determines an operation schedule of the energy equipment 2 and further formulates an energy supply plan for the building 1000 by using the equipment model 144a and the load model 143a, on the basis of the amount of energy demand in the building 1000 which is forecasted by the demand forecasting unit 143 and the data acquired from the memory device 13. The equipment model 144a is data indicating the energy input/output characteristics of the energy equipment 2 used as the target on a table or a graph. The equipment characteristic value data 131 is used to determine the input and output energy of the energy equipment 2. Further, details of the supply plan formulation unit 144 will be described later.

The control command conversion unit 145 converts the energy supply plan formulated by the supply plan formulation unit 144 into the control command used to actually give a command to the energy equipment 2.

FIG. 3 is a view showing an exemplary table representing parameters of the equipment model 144a in accordance with the present preferred embodiment. The parameters of the equipment model 144a are stored as a table where a numerical value is determined by one or more variables ($x_1 \ldots x_n$, $y_1 \ldots y_n$ in FIG. 3). A plurality of tables may be stored depending on a condition in which each equipment depends on a variable other than the variable stored in the table, or the like. Further, there may be a plurality of variables used for branching the condition.

Figure 4:
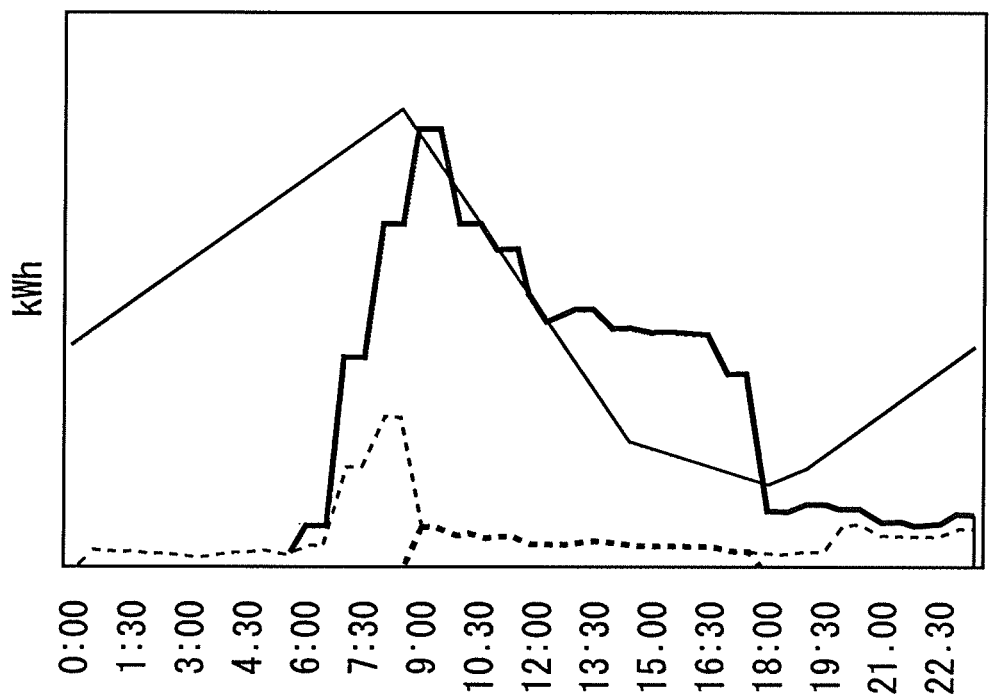
FIG. 4 is a graph showing an exemplary energy supply plan in accordance with the preferred embodiment.

FIG. 4 is a graph showing an exemplary energy supply plan in accordance with the present preferred embodiment. In FIG. 4, the vertical axis represents the amount of energy [kWh], and the horizontal axis represents the time.

In FIG. 4, the energy supply capability of energy equipment 2A is represented by the thick dotted line, the energy supply capability of energy equipment 2B is represented by the thin dotted line, a stacked value (total value) of the energy supply capabilities of the energy equipment 2A, the energy equipment 2B, and energy equipment 2C is represented by the thick solid line, and the amount of stored energy of the energy equipment 2C is represented by the thin solid line. Further, the energy supply capability of the energy equipment 2C is represented by a part obtained by subtracting the thick dotted line and the thin dotted line from the thick solid line.

As exemplarily shown in FIG. 4, it is assumed that the energy supply plan indicates the energy supply capability which each energy equipment should (can) output and the amount of remaining energy (the amount of stored energy) with respect to the amount of energy demand in chronological order.

The energy supply plan is converted by the control command conversion unit 145, into a format which can be recognized as the control command by each energy equipment 2, and transmitted to the energy equipment 2. Then, the energy equipment 2 supplies the energy which is required in the energy supply plan.

Figure 5:
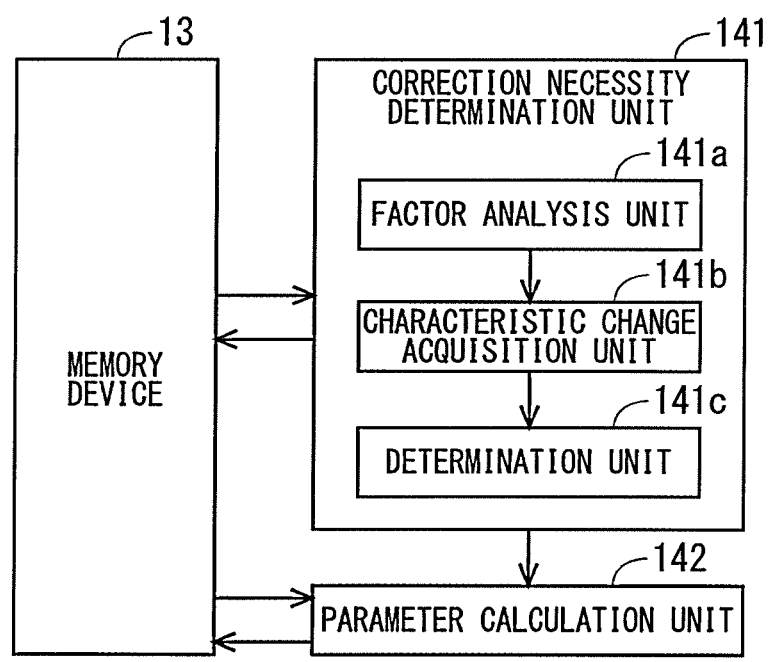
FIG. 5 is a view showing an exemplary configuration of a correction necessity determination unit and a parameter calculation unit in accordance with the preferred embodiment.

FIG. 5 is a view showing an exemplary configuration of the correction necessity determination unit 141 and the parameter calculation unit 142 in accordance with the present preferred embodiment. Since the energy supply plan formulation device 1 includes the correction necessity determination unit 141 and the parameter calculation unit 142, the energy supply plan formulation device 1 can assure the accuracy of the equipment model 144a and the load model 143a and stably supply energy in a cost-saving manner even when there occurs a characteristic change accompanying a change of the equipment configuration or performance degradation of the equipment.

The correction necessity determination unit 141 includes a factor analysis unit 141a, a characteristic change acquisition unit 141b, and a determination unit 141c. As described above, the correction necessity determination unit 141 determines whether to need correction of the equipment model 144a of the energy equipment 2 by using the data acquired from the memory device 13. The determination result on the necessity of correction is outputted to the parameter calculation unit 142.

The parameter calculation unit 142 selects one of the energy equipment 2, for which correction of a characteristic value or a parameter thereof is needed, on the basis of the determination result outputted from the correction necessity determination unit 141 as described above and calculates a new parameter for the parameter of either of (or both) the equipment model 144a and the load model 143a corresponding to the selected energy equipment 2 by using the data acquired from the memory device 13 and updates the parameter.

Figure 6:
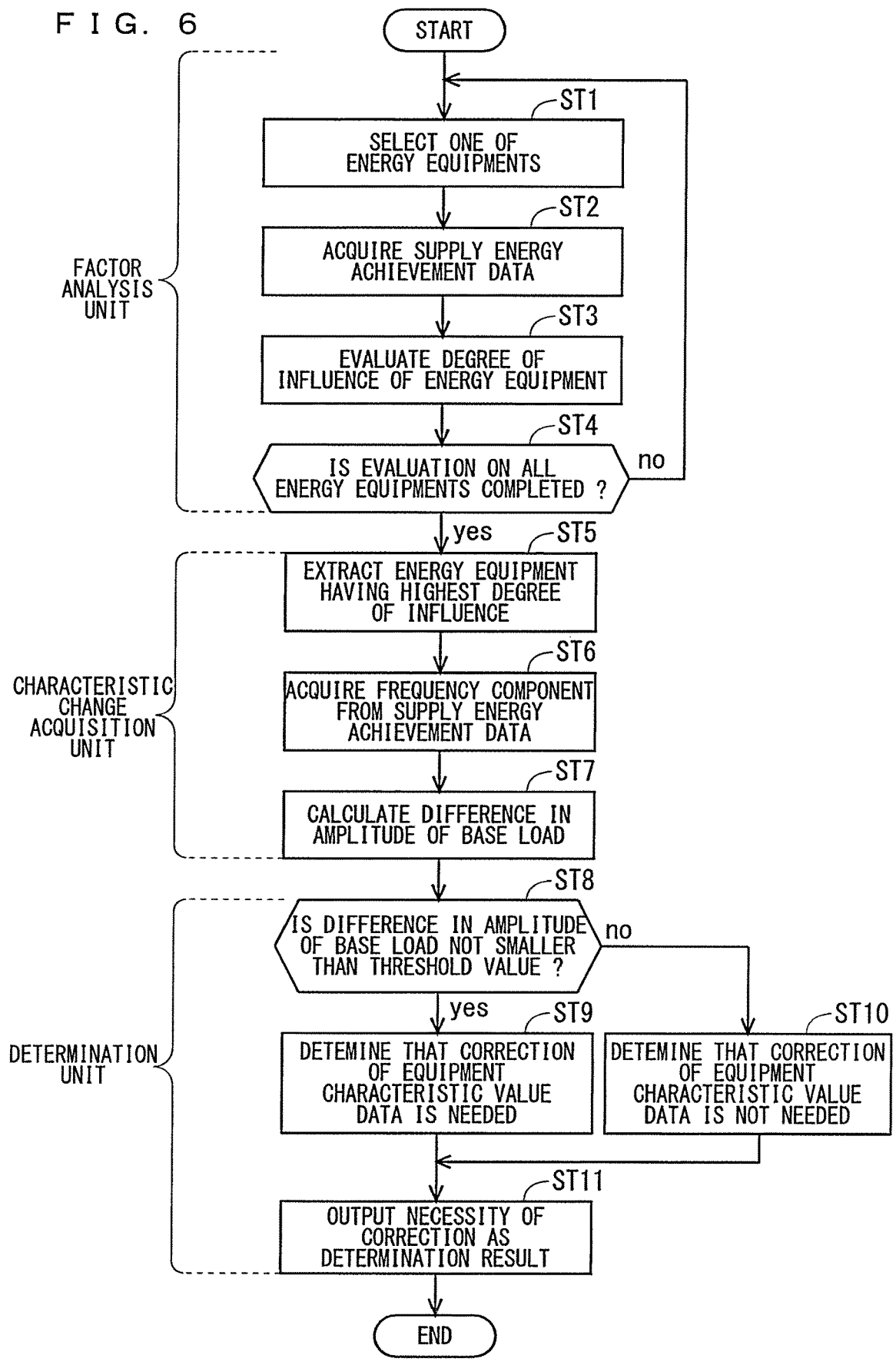
FIG. 6 is a flowchart showing an exemplary processing flow of the correction necessity determination unit in accordance with the preferred embodiment.

FIG. 6 is a flowchart showing an exemplary processing flow of the correction necessity determination unit 141 in accordance with the present preferred embodiment. The process steps from Step ST1 to Step ST4 in FIG. 6 are performed by the factor analysis unit 141a of the correction necessity determination unit 141. Further, the process steps from Step ST5 to Step ST7 in FIG. 6 are performed by the characteristic change acquisition unit 141b of the correction necessity determination unit 141. Furthermore, the process steps from Step ST8 to Step ST10 in FIG. 6 are performed by the determination unit 141c of the correction necessity determination unit 141.

First, in Step ST1, the factor analysis unit 141a selects one of the plurality of energy equipment 2 included in the energy supply system.

Next, in Step ST2, the factor analysis unit 141a acquires the supply energy achievement data 133 of the energy equipment 2 selected in Step ST1. Herein, though it is assumed that the supply energy achievement data 133 for a predetermined past period (for example, for seven days) are acquired from the memory device 13, the period of the data to be acquired is not limited to this.

Next, in Step ST3, the factor analysis unit 141a evaluates the degree of influence of the energy equipment 2 selected in Step ST1 in the energy supply system. The factor analysis unit 141a evaluates the degree of influence of the energy equipment 2 in the energy supply system by a method, for example, in which it is determined, with reference to the supply energy achievement data 133, that the energy equipment 2 has higher degree of influence as the ratio of the amount of energy supplied by the energy equipment 2 to the amount of energy supply of the whole energy supply system is higher.

Next, in Step ST4, the factor analysis unit 141a determines whether or not the evaluation on respective degrees of influence of all the energy equipment 2 included in the energy supply system is completed. Then, when the evaluation on respective degrees of influence of all the energy equipment 2 included in the energy supply system is completed, i.e., in the case corresponding to "YES" at the branch from Step ST4 exemplarily shown in FIG. 6, the process goes to Step ST5 exemplarily shown in FIG. 6. On the other hand, when there is still energy equipment 2 of which the evaluation on the degree of influence is not completed, i.e., in the case corresponding to "NO" at the branch from Step ST4 exemplarily shown in FIG. 6, the process goes back to Step ST1 exemplarily shown in FIG. 6.

In Step ST5, the characteristic change acquisition unit 141b compares the degrees of influence of the plurality of energy equipment 2 evaluated in Step ST3 and extracts the energy equipment 2 having the highest degree of influence.

Next, in Step ST6, the characteristic change acquisition unit 141b performs frequency analysis on the supply energy achievement data 133 of the energy equipment 2 extracted in Step ST5, to thereby acquire a frequency component. Herein, though the supply energy achievement data 133 for a predetermined past period (for example, for seven days) are acquired from the memory device 13, the period of the data to be acquired is not limited to this. In the frequency analysis, as shown in the following Eq. 1, a power spectrum which is a relation between the frequency and the amplitude is derived from the time-series data of the supply energy achievement data 133 serving as input data by using the Fourier transform.

$$F(x) = \sum_{t=0}^{n-1} y(t)\left(\cos\frac{2\pi tx}{n}\right) - i\sin\frac{2\pi tx}{n} \quad (1)$$

In Eq. 1, t represents calculation target time, x represents an order, n represents the total number of data, F(x) represents a numerical value after the Fourier transform at the order x, and y(t) represents an output at the time t. On the basis of this conversion (transform) result, the frequency is calculated by using the following Eq. 2, and the amplitude is calculated by using the following Eq. 3.

$$f(x) = \frac{x}{t_2 n} \quad (2)$$

In Eq. 2, f(x) represents a frequency at the order x.

$$A(x) = \frac{|F(x)|}{0.5 \times n} \quad (3)$$

In Eq. 3, A(x) represents an amplitude at the order x.

Next, in Step ST7, the characteristic change acquisition unit 141b searches for a DC (direct-current) component with reference to the frequency component acquired in Step ST6 and determines the DC component as the base load of the energy equipment. Herein, the base load refers to the amount of energy (the amount of power) to be maintained at least for a predetermined period, not depending on any season or time zone. Further, with the current time as a reference, a difference between the amplitude of the base load of the energy equipment at the current time and that on the previous day is calculated, and further a difference between the amplitude of the base load of the energy equipment at the current time and that in the previous period is calculated. In the extraction of the base load, the amplitude in a case where the frequency acquired in Step ST6 is 0 Hz is extracted as the DC component.

Next, in Step ST8, the determination unit 141c compares the difference in the amplitude of the base load of the energy equipment with the current time as a reference, which is calculated in Step ST7, with a predetermined threshold value. Further, the predetermined threshold value is a value which can be changed as appropriate and not limited to a specific value. Then, the determination unit 141c determines whether or not the difference in the amplitude of the base load of the energy equipment with the current time as a reference is not smaller than the predetermined threshold value.

When the difference in the amplitude of the base load with the current time as a reference is not smaller than the predetermined threshold value, i.e., in the case corresponding to "YES" at the branch from Step ST8 exemplarily shown in FIG. 6, the process goes to Step ST9 exemplarily shown in FIG. 6. On the other hand, when the difference in the amplitude of the base load with the current time as a reference is smaller than the predetermined threshold value, i.e., in the case corresponding to "NO" at the branch from Step ST8 exemplarily shown in FIG. 6, the process goes to Step ST10 exemplarily shown in FIG. 6.

In Step ST9, since the difference calculated in Step ST7 is not smaller than the threshold value, the determination unit 141c determines that it is necessary to correct the equipment characteristic value data 131 which is the parameter of the equipment model 144a.

In Step ST10, since the difference calculated in Step ST7 is smaller than the threshold value, the determination unit 141c determines that it is not necessary to correct the equipment characteristic value data 131 which is the parameter of the equipment model 144a.

Next, in Step ST11, the determination unit 141c outputs the necessity of correction which is determined in Step ST9 or Step ST10, as the determination result, to the parameter calculation unit 142.

FIG. 7 is a graph showing an exemplary extraction of the frequency component in accordance with the present preferred embodiment. In FIG. 7, the vertical axis represents the amplitude, and the horizontal axis represents the frequency. Further, FIG. 7 shows an exemplary frequency component acquired by performing the frequency analysis on the supply energy achievement data 133 in Steps ST6 and ST7 of FIG. 6.

In Step ST6, the power spectrum as shown in FIG. 7 is derived. Further, the DC component which is regarded as the base load of the energy equipment in Step ST7 becomes a part like the point P1 where the frequency is 0 Hz as described above. With reference to the amplitude of this part, it is determined whether to need correction.

Figure 8:
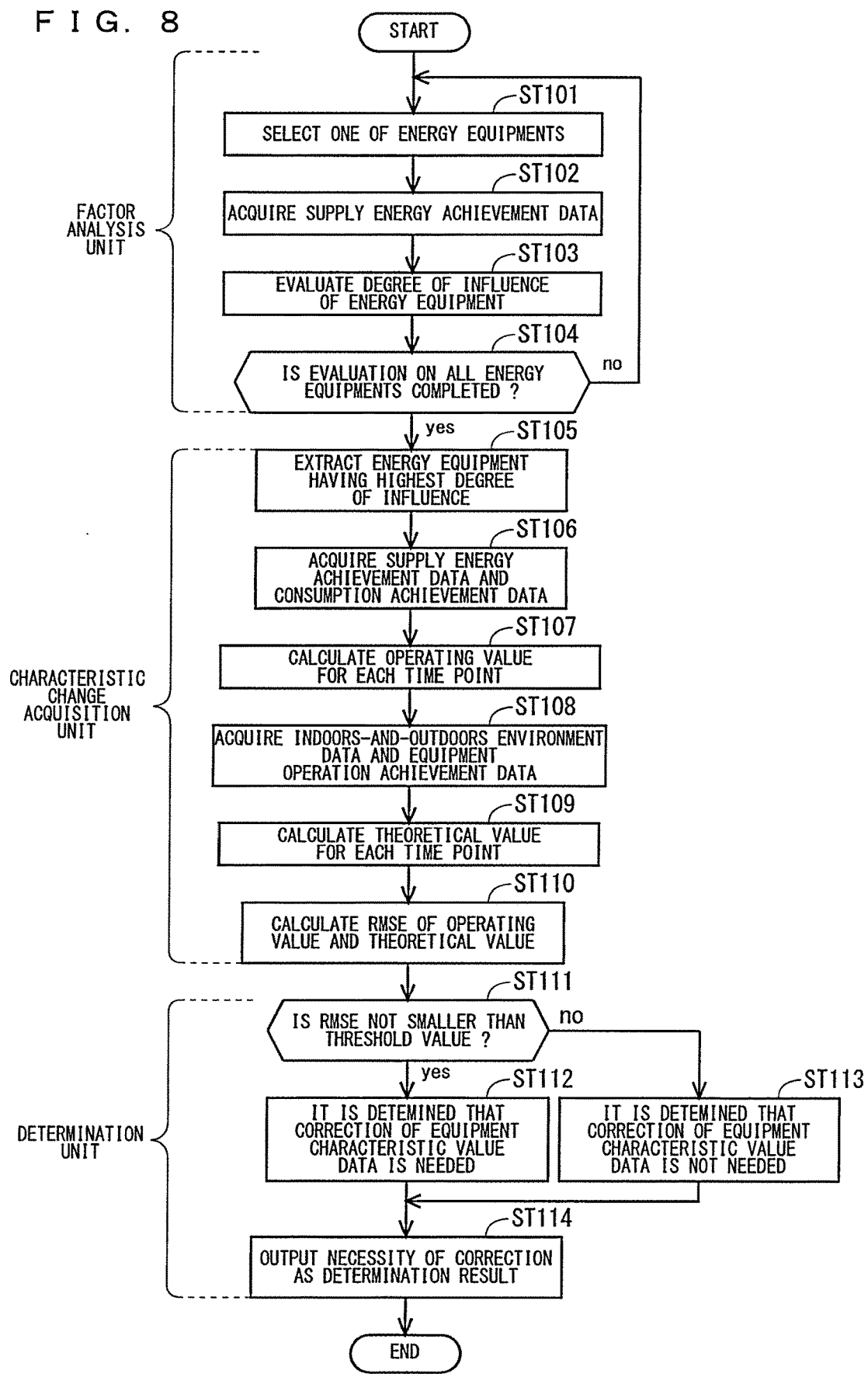
FIG. 8 is a flowchart showing an exemplary processing flow of the correction necessity determination unit in accordance with the preferred embodiment.

FIG. 8 is a flowchart showing an exemplary processing flow of the correction necessity determination unit 141 in accordance with the present preferred embodiment. Unlike in the processing flow of FIG. 6, the frequency analysis is not performed in the processing flow of FIG. 8.

The process steps from Step ST101 to Step ST104 in FIG. 8 are performed by the factor analysis unit 141a of the correction necessity determination unit 141. Further, the process steps from Step ST105 to Step ST110 in FIG. 8 are performed by the characteristic change acquisition unit 141b of the correction necessity determination unit 141. Furthermore, the process steps from Step ST111 to Step ST113 in FIG. 8 are performed by the determination unit 141c of the correction necessity determination unit 141.

The process steps from Step ST101 to Step ST105 in FIG. 8 are the same as the process steps from Step ST1 to Step ST5 shown in FIG. 6 and description thereof will be omitted.

Next, in Step ST106, the characteristic change acquisition unit 141b acquires the supply energy achievement data 133 and the consumption achievement data 134 of the energy equipment 2 extracted in Step ST105. Herein, though it is assumed that the supply energy achievement data 133 and the consumption achievement data 134 for a predetermined past period (for example, for seven days) are acquired from the memory device 13, the period of the data to be acquired is not limited to this.

Next, in Step ST107, the characteristic change acquisition unit 141b uses the data acquired in Step ST106 to calculate an operating value at each time point, which is a parameter to be corrected. In energy supply equipment such as a heat pump, a cogeneration system, or the like, which inputs power or the like and outputs the amount of heat or the like through energy conversion or another energy supply equipment such as solar photovoltaics (PV) or the like, which inputs heat or energy other than electric energy, the data is calculated by using the following Eq. 4 with a correction target as the operating value which is the parameter.

$$Parameter_m(t) = \frac{Q_m(t)}{P_m(t)} \quad (4)$$

In Eq. 4, t represents time, $Parameter_m(t)$ represents an operating value at the time t, $Q_m(t)$ represents the amount of output energy at the time t, and $P_m(t)$ represents the amount of input energy at the time t. Further, in energy transmission and reception equipment such as storage battery, a heat storage tank, or the like, which stores energy inside the equipment, without performing any energy conversion, to thereby adjust the amount of energy supply, the data is calculated by using the following Eq. 5 with a correction target as a coefficient regarding energy loss.

$$Q_{loss\_m}(t) = Q_{stock}(t-1) - Q_{stock}(t) + Q_{in}(t) - Q_{out}(t) \quad (5)$$

In Eq. 5, t represents time, $Q_{loss\_m}(t)$ represents an operating value at the time t, $Q_{stock}(t)$ represents the amount of stored energy at the time t, $Q_{in}(t)$ represents the amount of input energy at the time t, and $Q_{out}(t)$ represents the amount of output energy at the time t.

Next, in Step ST108, the characteristic change acquisition unit 141b acquires the indoors-and-outdoors environment data 135 and the equipment operation achievement data 136 of the energy equipment 2 which is extracted in Step ST105. Herein, though it is assumed that the indoors-and-outdoors environment data 135 and the equipment operation achievement data 136 for a predetermined past period (for example, for seven days) are acquired from the memory device 13, the period of the data to be acquired is not limited to this.

Next, in Step ST109, the characteristic change acquisition unit 141b uses the data acquired in Step ST108 to calculate a theoretical value at each time point, which is a parameter to be corrected. The theoretical value is calculated by using relevant data with reference to the equipment characteristic value data 131. In a case of the chiller which is a kind of the energy equipment 2, for example, by using a cold/hot water outlet temperature and an outside air temperature, the COP is calculated with reference to the table of the equipment characteristic value data 131.

Next, in Step ST110, the characteristic change acquisition unit 141b calculates a root mean square error (RMSE) of the operating value and the theoretical value which are calculated in Step ST107 and Step ST109, respectively. Specifically, the characteristic change acquisition unit 141b acquires an index of the change of the base load on the basis of the RMSE of the operating value and the theoretical value. The RMSE is calculated by using the following Eq. 6.

$$RMSE = \sqrt{\frac{1}{n}\sum_{i=1}^{n}\left(Parameter_{c_i} - Parameter_{m_i}\right)^2} \quad (6)$$

In Eq. 6, n represents the total number of time steps, i represents a time step, $Parameter_{ci}$ represents a theoretical value at the time step i, and $Parameter_{mi}$ represents an operating value at the time step i.

Further, in a case of the energy transmission and reception equipment, similarly, the RMSE is calculated by using the following Eq. 7.

$$RMSE = \sqrt{\frac{1}{n}\sum_{i=1}^{n}(Q_{loss\_ci} - Q_{loss\_mi})^2} \quad (7)$$

In Eq. 7, n represents the total number of time steps, i represents a time step, $Q_{loss\_ci}$ represents a theoretical value at the time step i, and $Q_{loss\_mi}$ represents an operating value at the time step i.

Next, in Step ST111, the determination unit 141c compares the RMSE calculated in Step ST110 with a predetermined threshold value. Further, the predetermined threshold value is a value which can be changed as appropriate and not limited to a specific value. Then, the determination unit 141c determines whether or not the RMSE is not smaller than the predetermined threshold value. Specifically, the determination unit 141c determines whether or not the change of the base load is not smaller than the threshold value on the basis of the RMSE of the operating value and the theoretical value.

When the RMSE is not smaller than the predetermined threshold value, i.e., in the case corresponding to "YES" at the branch from Step ST111 exemplarily shown in FIG. 8, the process goes to Step ST112 exemplarily shown in FIG. 8. On the other hand, when the RMSE is smaller than the predetermined threshold value, i.e., in the case corresponding to "NO" at the branch from Step ST111 exemplarily shown in FIG. 8, the process goes to Step ST113 exemplarily shown in FIG. 8.

In Step ST112, since the RMSE calculated in Step ST111 is not smaller than the threshold value, the determination unit 141c determines that it is necessary to correct the equipment characteristic value data 131 which is the parameter of the equipment model 144a.

In Step ST113, since the RMSE calculated in Step ST111 is smaller than the threshold value, the determination unit 141c determines that it is not necessary to correct the equipment characteristic value data 131 which is the parameter of the equipment model 144a.

Next, in Step ST114, the determination unit 141c outputs the necessity of correction which is determined in Step ST112 or Step ST113, as the determination result, to the parameter calculation unit 142.

According to the processing flow shown in FIG. 8, by the threshold comparison using the RMSE, it is possible to determine whether to need correction of not only the equipment characteristic value data 131 but also the parameter of any other model. By determining the operating value as a demand forecast value calculated in the past and determining the theoretical value as the supply energy achievement data 133, the magnitude of a forecast error of the load model 143a can be determined by the determination unit 141c, and it becomes possible to determine whether to need correction of the parameter of the load model 143a.

Figure 9:
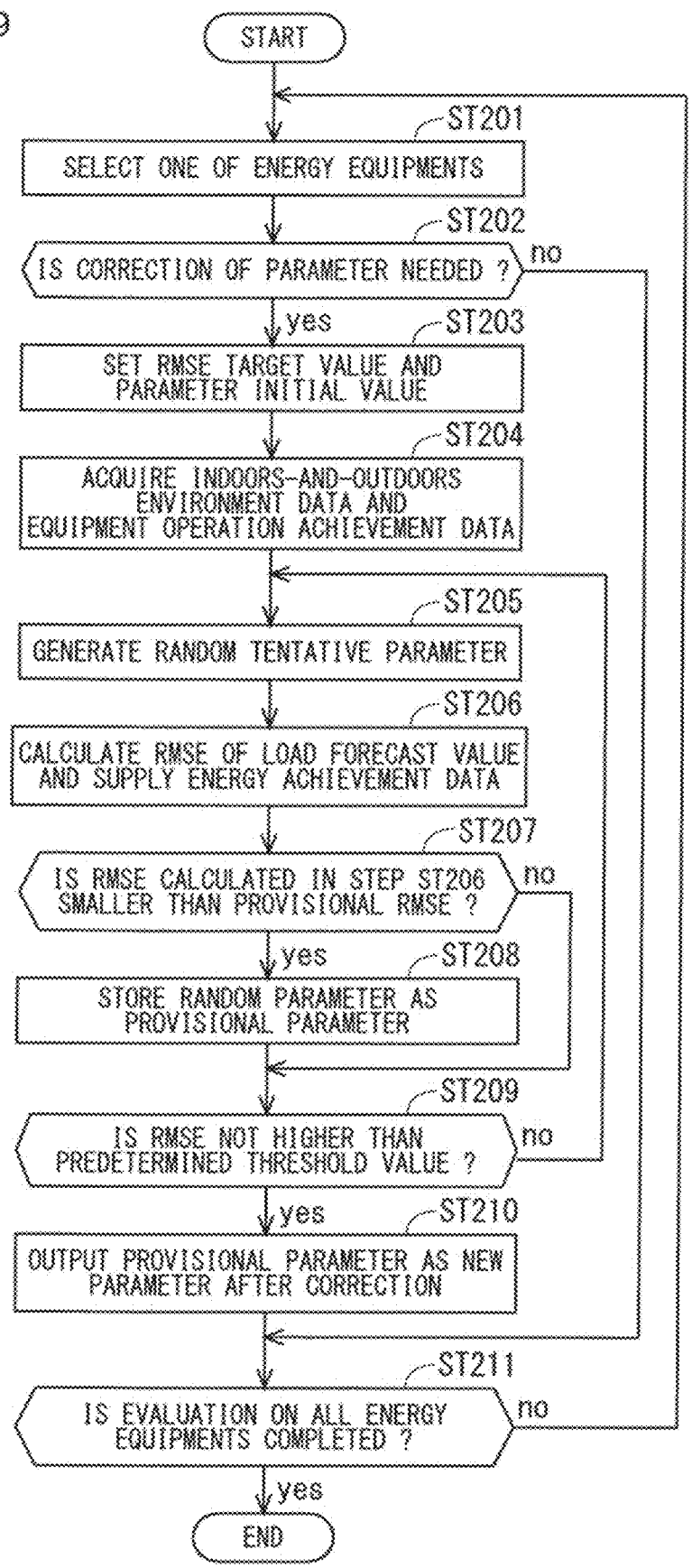
FIG. 9 is a flowchart showing an exemplary processing flow of the parameter calculation unit in accordance with the preferred embodiment.

FIG. 9 is a flowchart showing an exemplary processing flow of the parameter calculation unit 142 in accordance with the present preferred embodiment.

First, in Step ST201, selected is one of the plurality of energy equipment 2 included in the energy supply system.

Next, in Step ST202, with reference to the determination result on the necessity of correction of the energy equipment 2 selected in Step ST201, from the correction necessity determination unit 141, it is determined whether to need correction of the parameter of the equipment model 144a of the selected energy equipment 2 (i.e., the equipment characteristic value data 131).

When correction of the parameter of the equipment model 144a of the selected energy equipment 2 is needed, i.e., in the case corresponding to "YES" at the branch from Step ST202 exemplarily shown in FIG. 9, the process goes to Step ST203 exemplarily shown in FIG. 9. On the other hand, when correction of the parameter of the equipment model 144a of the selected energy equipment 2 is not needed, i.e., in the case corresponding to "NO" at the branch from Step ST202 exemplarily shown in FIG. 9, the process goes to Step ST211 exemplarily shown in FIG. 9.

In Step ST203, for a random search process to be performed in the later step, set are an RMSE target value and a parameter initial value. The RMSE target value is an arbitrary numerical value, and is assumed to be, for example, the predetermined threshold value used for comparison with the RMSE in Step ST111 of FIG. 8. Further, the parameter initial value is an arbitrary numerical value, and is assumed to be, for example, a value of the parameter which is currently adopted for the model.

Next, in Step ST204, the indoors-and-outdoors environment data 135 and the supply energy achievement data 133 of the energy equipment 2 extracted in Step ST201 are acquired. Herein, though it is assumed that the indoors-and-outdoors environment data 135 and the supply energy achievement data 133 for a predetermined past period (for example, for seven days) are acquired from the memory device 13, the period of the data to be acquired is not limited to this.

Next, in Step ST205, for the random search process to be performed in the later step, generated is a random tentative parameter. A range in which the parameters are randomly dispersed is not particularly limited.

Next, in Step ST206, a load forecast is performed by using the random parameter generated in Step ST205, and an RMSE of the load forecast value and the supply energy achievement data 133 is calculated. The RMSE is calculated by using the following Eq. 8.

$$RMSE = \sqrt{\frac{1}{n}\sum_{i=1}^{n}(Q_{ci} - Q_{mi})^2} \qquad (8)$$

In Eq. 8, n represents the total number of time steps, i represents a time step, $Q_{ci}$ represents a load forecast value at the time step i, and $Q_{mi}$ represents a supply energy achievement value at the time step i.

Next, in Step ST207, it is determined whether or not the RMSE calculated in Step ST206 is smaller than a provisional RMSE. The provisional RMSE is assumed to be the RMSE to be stored in Step ST208 described later.

When the RMSE calculated in Step ST206 is smaller than the provisional RMSE, i.e., in the case corresponding to "YES" at the branch from Step ST207 exemplarily shown in FIG. 9, the process goes to Step ST208 exemplarily shown in FIG. 9. On the other hand, when the RMSE calculated in Step ST206 is not smaller than the provisional RMSE, i.e., in the case corresponding to "NO" at the branch from Step ST207 exemplarily shown in FIG. 9, the process goes to Step ST209 exemplarily shown in FIG. 9. Further, when the provisional RMSE is not stored, the process goes to Step ST208.

In Step ST208, since the RMSE calculated in Step ST206 is smaller than the provisional RMSE, the random parameter generated in Step ST205 is stored as a provisional parameter. Herein, when there is a provisional parameter which has been stored so far, the old provisional parameter is updated to a new provisional parameter. Further, the RMSE calculated in Step ST206 is stored as the provisional RMSE. Herein, when there is a provisional RMSE which has been stored so far, the old provisional RMSE is updated to a new provisional RMSE.

In Step ST209, it is determined whether or not the RMSE calculated in Step ST206 is not larger than a predetermined threshold value. Herein, the predetermined threshold value is assumed to be the RMSE target value set in Step ST203.

When the RMSE calculated in Step ST206 is not larger than the predetermined threshold value, i.e., in the case corresponding to "YES" at the branch from Step ST209 exemplarily shown in FIG. 9, the process goes to Step ST210 exemplarily shown in FIG. 9. On the other hand, when the RMSE calculated in Step ST206 is larger than the predetermined threshold value, i.e., in the case corresponding to "NO" at the branch from Step ST209 exemplarily shown in FIG. 9, the process goes back to Step ST205 exemplarily shown in FIG. 9.

In Step ST210, since the RMSE calculated in Step ST206 is not larger than the predetermined threshold value, the provisional parameter stored in Step ST208 is outputted as a new parameter after correction.

Next, in Step ST211, it is determined whether or not the evaluation of all the energy equipment 2 included in the energy supply system is completed. Then, when the evaluation of all the energy equipment 2 included in the energy supply system is completed, i.e., in the case corresponding to "YES" at the branch from Step ST211 exemplarily shown in FIG. 9, the process is ended. On the other hand, when there is still energy equipment 2 of which the evaluation is not completed, i.e., in the case corresponding to "NO" at the branch from Step ST211 exemplarily shown in FIG. 9, the process goes back to Step ST201 exemplarily shown in FIG. 9.

According to the processing flow shown in FIG. 9, it is possible to correct not only the equipment characteristic value data 131 but also the parameter of any other model. For example, by changing the "equipment operation achievement data" in Step ST204 to the "supply energy achievement data", it becomes possible to correct the parameter of the load model 143a. Further, in this case, the above-described Step ST201 and Step ST211 are not needed.

Figure 10:
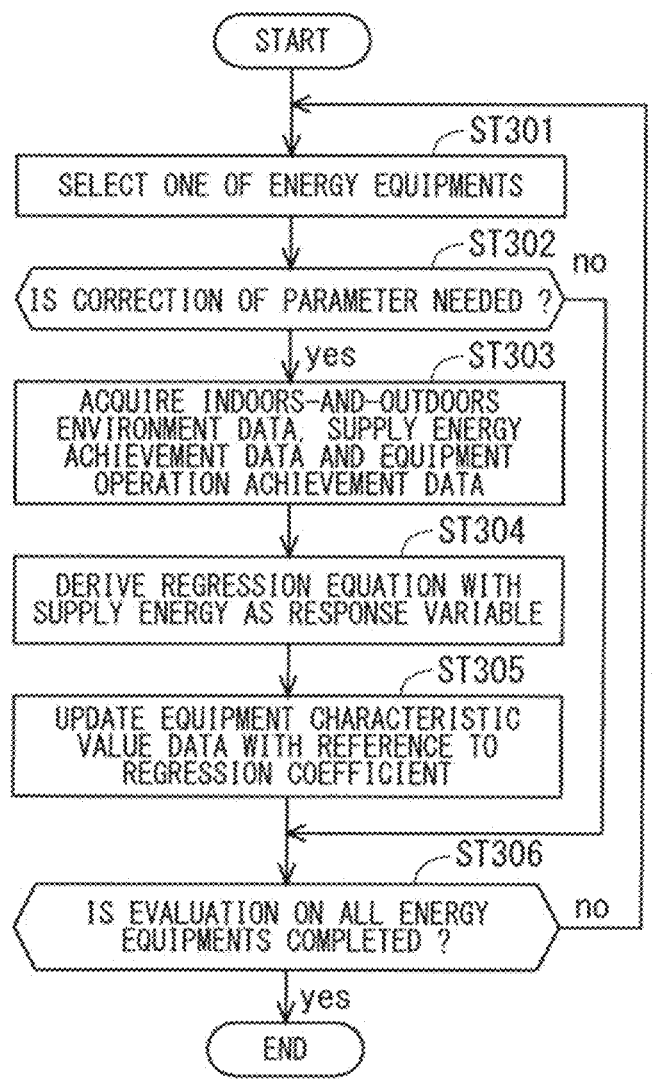
FIG. 10 is a flowchart showing an exemplary processing flow of the parameter calculation unit in accordance with the preferred embodiment.

FIG. 10 is a flowchart showing an exemplary processing flow of the parameter calculation unit 142 in accordance with the present preferred embodiment. Unlike in the processing flow of FIG. 9, the random search is not performed in the processing flow of FIG. 10.

First, in Step ST301, selected is one of the plurality of energy equipment 2 included in the energy supply system.

Next, in Step ST302, with reference to the determination result on the necessity of correction of the energy equipment 2 selected in Step ST201, from the correction necessity determination unit 141, it is determined whether to need correction of the parameter of the equipment model 1144a of the selected energy equipment 2.

When correction of the parameter of the equipment model 144a of the selected energy equipment 2 is needed, i.e., in the case corresponding to "YES" at the branch from Step ST302 exemplarily shown in FIG. 10, the process goes to Step ST303 exemplarily shown in FIG. 10. On the other hand, when correction of the parameter of the equipment model 144a of the selected energy equipment 2 is not needed, i.e., in the case corresponding to "NO" at the branch from Step ST302 exemplarily shown in FIG. 10, the process goes to Step ST306 exemplarily shown in FIG. 10.

In Step ST303, the indoors-and-outdoors environment data 135, the supply energy achievement data 133 of the energy equipment 2 extracted in Step ST301, and the equipment operation achievement data 136 are acquired. Herein, though it is assumed that the indoors-and-outdoors environment data 135, the supply energy achievement data 133, and the equipment operation achievement data 136 for a predetermined past period (for example, for seven days) are acquired from the memory device 13, the period of the data to be acquired is not limited to this.

Next, in Step ST304, by the multivariate linear regression analysis, a regression equation with the supply energy as a response variable is derived. The regression equation is derived as shown in the following Eq. 9.

$$Q_c = x_1\alpha_1 + x_2\alpha_2 \ldots + \beta \quad (9)$$

In Eq. 9, $Q_c$ represents the amount of supply energy, $\alpha_1, \alpha_2, \ldots$ each represent a regression coefficient, $x_1, x_2, \ldots$ each represent an explanatory variable, and $\beta$ represents a constant term. Further, each regression coefficient is calculated as a minimization problem of the following Eq. 10 on the basis of the concept of the least-squares method.

$$\min \Sigma^n_{i=1}(y_i - \alpha_1 x_1 - \alpha_2 x_{2i} \ldots - \beta) \quad (10)$$

In Eq. 10, i represents the total number of data, $y_i$ represents a response variable of the i-th data, $\alpha_1, \alpha_2, \ldots$ each represent a regression coefficient, $x_1, x_2, \ldots$ each represent an explanatory variable of the i-th data, and $\beta$ represents a constant term. The explanatory variable of the regression equation is data related to the energy equipment 2 selected in Step ST301.

Next, in Step ST305, with reference to the regression coefficient in the regression equation derived in Step ST304, the equipment characteristic value data 131 is updated. The objective function in the regression equation can be the equipment characteristic value data 131, instead of the amount of energy. In a case of the chiller which is a kind of the energy equipment 2, for example, with reference to the regression coefficient in the regression equation with the cold/hot water outlet temperature and the outside air temperature used as explanatory variables and with the COP used as a response variable, the numerical value of the parameter stored in the table of the equipment characteristic value data 131 is updated. In that case, the COP is such an operating value as calculated in Step ST107 of FIG. 8. The regression equation is derived as shown in the following Eq. 11.

$$\text{Parameter}_c = x_1\alpha_1 + x_2\alpha_2 \ldots + \beta \quad (11)$$

In Eq. 11, Parameter® represents a theoretical value of the parameter to be corrected, $\alpha_1, \alpha_2, \ldots$ each represent a regression coefficient, $x_1, x_2, \ldots$ each represent an explanatory variable, and $\beta$ represents a constant term.

In Step ST306, it is determined whether or not the evaluation of all the energy equipment 2 included in the energy supply system is completed. Then, when the evaluation of all the energy equipment 2 included in the energy supply system is completed, i.e., in the case corresponding to "YES" at the branch from Step ST306 exemplarily shown in FIG. 10, the process is ended. On the other hand, when there is still energy equipment 2 of which the evaluation is not completed, i.e., in the case corresponding to "NO" at the branch from Step ST306 exemplarily shown in FIG. 10, the process goes back to Step ST301 exemplarily shown in FIG. 10.

According to the processing flow shown in FIG. 10, it is possible to correct not only the parameter of the equipment model 144a but also the parameter of any other model. For example, by changing the "equipment characteristic value data" in Step ST305 to the "load model parameter", it becomes possible to correct the parameter of the load model 143a. Further, in this case, the above-described Step ST301 and Step ST306 are not needed.

Figure 11:
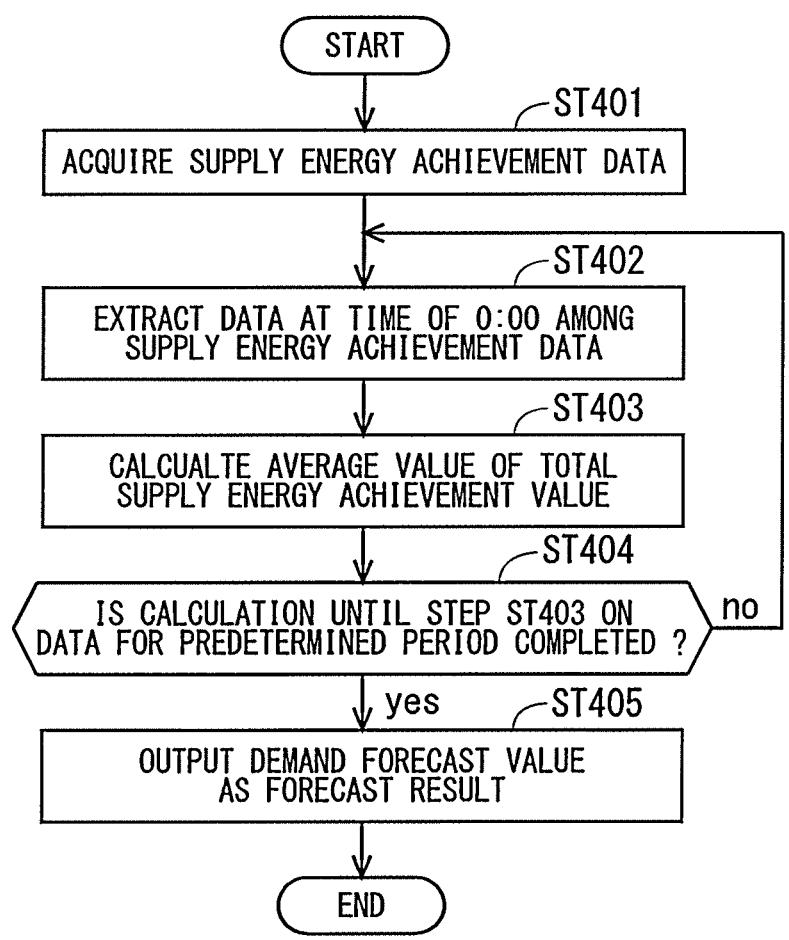
FIG. 11 is a flowchart showing an exemplary processing flow of a demand forecasting unit in accordance with the preferred embodiment.

FIG. 11 is a flowchart showing an exemplary processing flow of the demand forecasting unit 143 in accordance with the present preferred embodiment.

First, in Step ST401, the supply energy achievement data 133 of all the energy equipment 2 included in the energy supply system are acquired. Herein, though it is assumed that the supply energy achievement data 133 for a predetermined past period (for example, for seven days) are acquired from the memory device 13, the period of the data to be acquired is not limited to this. The supply energy achievement data 133 indicate, for example, the amount of energy supplied to an air conditioning load as cold/hot water by heat source equipment, the amount of energy supplied to a hot water supply load as hot water by a water heater, or the like.

Next, in Step ST402, extracted is only a piece of data at the time of 0:00 in each day among the supply energy achievement data 133 acquired in Step ST401. This extraction is made for performing the process of later-described.

Step ST403 at each time point, and the data to be extracted are changed every predetermined time interval. Then, every time when a repeating operation for executing Step ST402 after being back from later-described Step ST404 is performed, the time step is advanced by one. Though this repeating operation is performed for a predetermined period (for example, from 0:00 to 24:00), this period is not limited to a specific period such as a unit of day or the like.

Next, in Step ST403, the supply energy achievement values at the time points extracted in Step ST402 are summed up and the sum is determined as a total supply energy achievement value of the energy supplied to the building 1000 by all the energy equipment 2. Then, an average value of the total supply energy achievement value is calculated. The average value is the demand forecast value and calculated by using the following Eq. 12.

$$Q_t = \frac{\sum_{d=1}^{N} Q(d, t)}{N} \qquad (12)$$

In Eq. 12, $Q_t$ represents a demand forecast value at the time t, $Q(d, t)$ represents a supply energy achievement value at the time t of d days ago, and N represents the number of days when the supply energy achievement data 133 are acquired in Step ST401.

Next, in Step ST404, it is determined whether or not the calculation until Step ST403 on the data for a predetermined period is completed. When the calculation until Step ST403 on the data for the predetermined period is completed, i.e., in the case corresponding to "YES" at the branch from Step ST404 exemplarily shown in FIG. 11, the process goes to Step ST405 exemplarily shown in FIG. 11. On the other hand, when the calculation until Step ST403 on the data for the predetermined period is not completed, i.e., in the case corresponding to "NO" at the branch from Step ST404 exemplarily shown in FIG. 11, the process goes back to Step ST402 exemplarily shown in FIG. 11.

In Step ST405, the calculated demand forecast values at all the time points are outputted as a forecast result.

Figure 12:
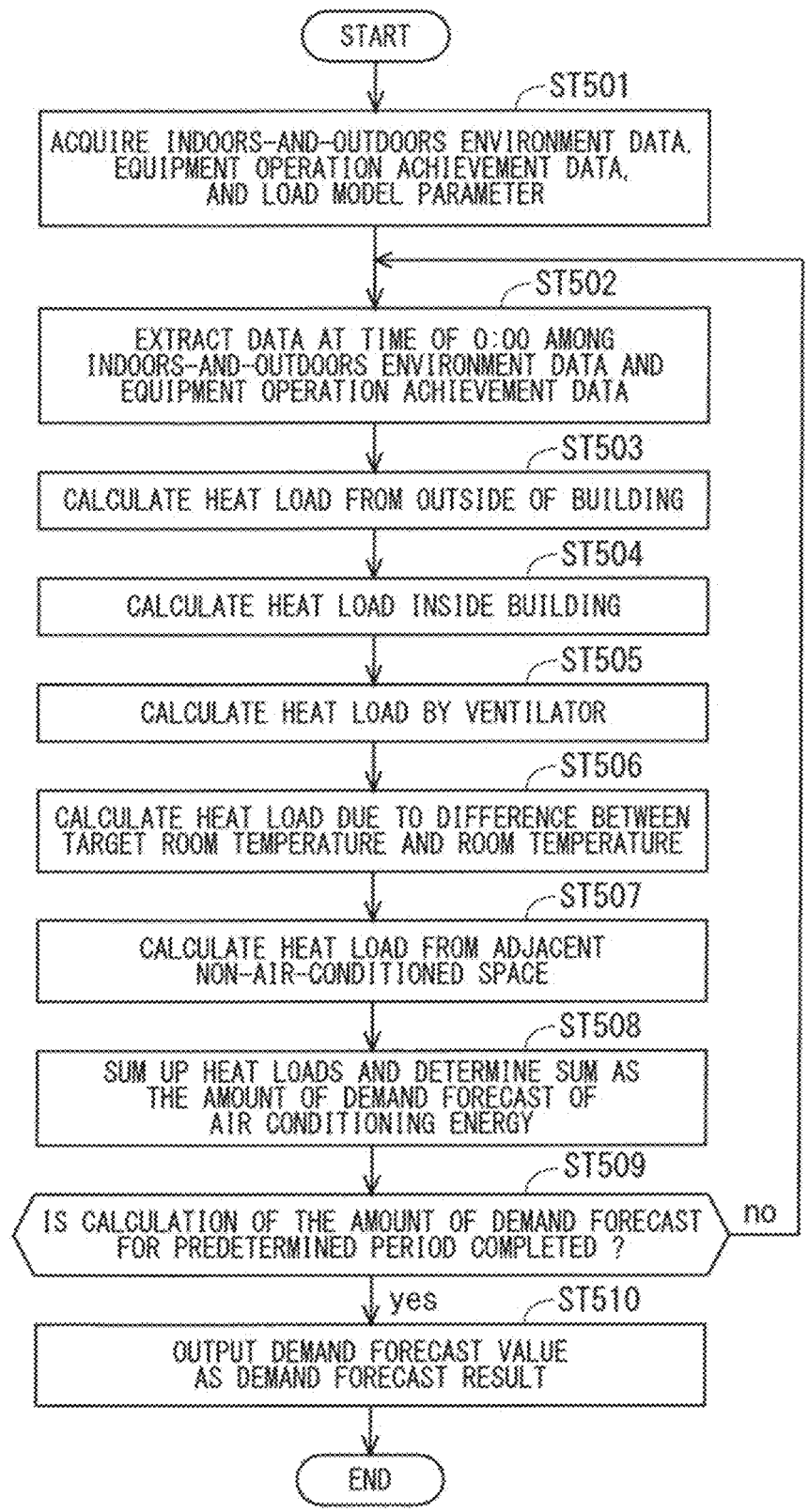
FIG. 12 is a flowchart showing an exemplary processing flow of the demand forecasting unit in accordance with the preferred embodiment.

FIG. 12 is a flowchart showing an exemplary processing flow of the demand forecasting unit 143 in accordance with the present preferred embodiment. Unlike in the processing flow of FIG. 11, the demand forecast value is calculated by using the physical formula in the processing flow of FIG. 12, instead of the calculation method using the average value for each time point. In the case of calculating the amount of supply energy needed for an air conditioner to process the heat load, it is possible to use the physical formula to calculate the amount of heat. The processing flow shown in FIG. 12 is used to forecast the amount of demand of energy to be supplied to such an air conditioner.

First, in Step ST501, the indoors-and-outdoors environment data 135, the equipment operation achievement data 136 of the energy equipment 2 among the plurality of energy equipment 2 included in the energy supply system, which concerns the calculation using the physical formula, and the load model parameter 132 are acquired. Though the information on weather forecast such as the outside air temperature, the amount of solar radiation, or the like and the room temperature stored most recently before the current time are acquired from the memory device 13 as the indoors-and-outdoors environment data 135, the period of the data to be acquired is not limited to this. As the equipment operation achievement data, the data stored most recently before the current time are acquired from the memory device 13.

Next, in Step ST502, extracted is only a piece of data at the time of 0:00 in each day among the indoors-and-outdoors environment data 135 and the equipment operation achievement data 136 acquired in Step ST501. This extraction is made for performing the process from later-described Step ST503 to Step ST508 at each time point, and the data to be extracted are changed every predetermined time interval. Then, every time when a repeating operation for executing the process from Step ST502 to Step ST508 after being back from later-described Step ST509 is performed, the time step is advanced by one. Though this repeating operation is performed for a predetermined period (for example, from 0:00 to 24:00), this period is not limited to a specific period such as a unit of day or the like.

Next, in Step ST503, the heat load from the outside of the building 1000 is calculated as below on each case of cooling and heating.

Cooling: $Q_0 =$ $$\left\{ \frac{\alpha A_{wi} R}{1000} + A_{wi} U_{wi}(T_0 - T_{set}) + A_{waout} U_{waout}\left(T_0 + \frac{\beta R}{1000 \times \gamma} - T_{set}\right) \right\} \times \frac{t_d}{60}$$

Heating: $Q_0 =$ $$\left\{ \frac{\alpha A_{wi} R}{1000} + A_{wi} U_{wi}(T_{set} - T_0) + A_{waout} U_{waout}\left(T_{set} + \frac{\beta R}{1000 \times \gamma} - T_0\right) \right\} \times \frac{t_d}{60}$$

Here, $Q_0$ represents a heat load from the outside of the building 1000 at the time, $A_{wi}$ represents a window area, $A_{waout}$ represents an outer wall area, $U_{wi}$ represents a window heat transmission coefficient, $U_{waout}$ represents an outer wall heat transmission coefficient, R represents the amount of solar radiation, $T_0$ represents an outside air temperature, $T_{set}$ represents a target room temperature, a represents a window shading coefficient, $\beta$ represents solar absorptance, represents a surface heat transfer coefficient, and $t_d$ represents a time interval.

Next, in Step ST504, the heat load inside the building 1000 is calculated as below on each case of cooling and heating.

$$\text{Cooling} \begin{cases} Q_{in} = (Q_{in\_human} + Q_{in\_OA} + Q_{in\_light}) \times \frac{t_d}{60} \\ Q_{in\_human} = Q_{human} \times x_{human} \\ Q_{in\_OA} = Q_{OA} \times x_{OA} \\ Q_{in\_light} = Q_{light} \times x_{light} \end{cases}$$

$$\text{Heating} \begin{cases} Q_{in} = (Q_{in\_human} + Q_{in\_OA} + Q_{in\_light}) \times \frac{t_d}{60} \times (-1) \\ Q_{in\_human} = Q_{human} \times x_{human} \times (-1) \\ Q_{in\_OA} = Q_{OA} \times x_{OA} \times (-1) \\ Q_{in\_light} = Q_{light} \times x_{light} \times (-1) \end{cases}$$

Here, $Q_{in}$ represents a heat load inside the building 1000, $Q_{human}$ represents a human heat load, $Q_{OA}$ represents an OA equipment heat load, $Q_{light}$ represents a lighting equipment heat load, $x_{human}$ represents the number of persons present, $x_{OA}$ represents the number of used OA equipment, $x_{light}$ represents the number of illuminated lighting equipment, $Q_{in\_human}$ represents a total human heat load, $Q_{in\_OA}$ represents a total OA equipment heat load, and $Q_{in\_light}$ represents a total lighting equipment heat load.

Next, in Step ST505, the heat load by a ventilator is calculated as below on each ease of cooling and heating.

Cooling $\begin{cases} Q_v = \rho_a C_a V_v (T_v - T_{set}) \times \dfrac{t_d}{3600} \\ T_v = T_{set} + (1 - \eta_v)(T_0 - T_{set}) \end{cases}$ Heating $\begin{cases} Q_v = \rho_a C_a V_v (T_{set} - T_v) \times \dfrac{t_d}{3600} \\ T_v = T_{set} - (1 - \eta_v)(T_{set} - T_0) \end{cases}$ Here, $Q_v$ represents a heat load by the ventilator, $V_v$ represents ventilation air flow, $T_{set}$ represents a target room temperature, $\rho_a$ represents air density, $C_a$ represents an air specific heat, $\eta_v$ represents temperature exchange efficiency of the ventilator, $T_0$ represents an outside air temperature, and $t_d$ represents a time interval.

Next, in Step ST506, the heat load due to the difference between the target room temperature and the room temperature is calculated as below on each case of cooling and heating.

Cooling: $Q_t = \dfrac{\rho_a C_a V_{area}(T_{in} - T_{set})}{3600}$

Heating: $Q_t = \dfrac{\rho_a C_a V_{area}(T_{set} - T_{in})}{3600}$

Here, $Q_t$ represents a heat load due to the difference between the target room temperature and the room temperature, $V_{area}$ represents area volume, $T_{in}$ represents a room temperature, $T_{set}$ represents a target room temperature, $\rho_a$ represents air density, and $C_a$ represents an air specific heat.

Next, in Step ST507, the heat load from an adjacent non-air-conditioned space is calculated as below on each case of cooling and heating.

Cooling: $Q_n = \sum_{i=1}^{N_n} \left\{ A_{wa_{in_i}} U_{wa_{in_i}} (T_n - T_{set}) \right\} \times \dfrac{t_d}{60}$ Heating: $Q_n = \sum_{i=1}^{N_n} \left\{ A_{wa_{in_i}} U_{wa_{in_i}} (T_{set} - T_n) \right\} \times \dfrac{t_d}{60}$ Here, $Q_n$ represents a heat load due to heat transmission from a wall, $N_n$ represents the number of adjacent spaces, $A_{waini}$ represents an inner wall area, $U_{waini}$ represents an inner wall heat transmission coefficient, represents a temperature inside an adjacent space, $T_{set}$ represents a target room temperature, and $t_d$ represents a time interval.

Further, the heat load from the adjacent non-air-conditioned space can be calculated as below on each case of cooling and heating.

Cooling: $Q_p = \dfrac{\rho_a C_a t_d}{3600} \sum_{i=1}^{N_p} V_p (T_p - T_{set})$ Heating: $Q_p = \dfrac{\rho_a C_a t_d}{3600} \sum_{i=1}^{N_p} V_p (T_{set} - T_p)$ Here, $Q_p$ represents a heat load due to pass air, $N_p$ represents the number of adjacent spaces, $V_p$ represents pass air flow, $T_p$ represents a temperature inside an adjacent space. $T_{set}$ represents a target room temperature, $\rho_a$ represents air density. $C_a$ represents an air specific heat, and $t_d$ represents a time interval.

Next, in Step ST508, the heat loads calculated from Step ST503 to Step ST507 are summed up and the sum is determined as the demand forecast value of energy to be supplied to the building 1000. The demand forecast value is calculated by the following Eq. 13.

$$Q_{hvac\_area} = Q_0 + Q_v + Q_t + Q_{in} + Q_n + Q_p \tag{13}$$

Here, $Q_{hvac\_area}$ represents the demand forecast value.

Next, in Step ST509, it is determined whether or not the calculation of the demand forecast value for a predetermined period is completed. When the calculation of the demand forecast value for the predetermined period is completed, i.e., in the case corresponding to "YES" at the branch from Step ST509 exemplarily shown in FIG. 12, the process goes to Step ST510 exemplarily shown in FIG. 12. On the other hand, when the calculation of the demand forecast value for the predetermined period is not completed, i.e., in the case corresponding to "NO" at the branch from Step ST509 exemplarily shown in FIG. 12, the process goes back to Step ST502 exemplarily shown in FIG. 12.

In Step ST510, the calculated demand forecast values for all the time points are outputted as a forecast result.

FIG. 13 is a flowchart showing an exemplary processing flow of the supply plan formulation unit 144 in accordance with the present preferred embodiment. The processing shown in FIG. 13 is performed mainly by an optimization engine 144b of FIG. 2.

First, in Step ST601, set are respective prices and control target values of both (or either of) electricity and gas. The control target value is an upper limit value of the price of each of electricity and gas consumed to supply energy. Further, an arbitrary value can be set as the control target value.

Next, in Step ST602, the equipment characteristic value data 131 of all the energy equipment 2 included in the energy supply system and the demand forecast value outputted from the demand forecasting unit 143 are acquired.

Next, in Step ST603, an optimization problem of an electric power cost and a fuel cost is created. The optimization problem is expressed as the following Eq. 14.

$$\min \sum_{t=1}^{T} (p_{cost}(t) + g_{cost}(t)) \tag{14}$$

$$p_{cost}(t) = p_{price}(t) \cdot p_{buy}(t) \cdot \dfrac{\Delta t}{60}$$

$$g_{cost}(t) = q_{price}(t) \cdot g_{buy}(t)$$

Here, t represents time, $p_{price}(t)$ represents an electric power unit purchase price at the time t, $p_{buy}(t)$ represents an electric power purchase amount at the time t, $g_{price}(t)$ represents a fuel unit purchase price at the time t, and $g_{buy}(t)$ represents a fuel purchase amount at the time t.

Next, in Step ST604, the amount of energy to be supplied from each of all the energy equipment 2 included in the energy supply system is set for each time point, and the energy supply plan is thereby formulated. When the amount of energy to be supplied is set in Step ST607 described later, reference is made to the set amount.

Next, in Step ST605, calculated is a cost required to supply energy in the case where the energy equipment 2 is operated in accordance with the energy supply plan formulated in Step ST604. For the calculation, used is the optimization problem (see Eq. 14) of the electric power cost and the fuel cost, which is created in Step ST603.

Next, in Step ST606, it is determined whether or not the energy supply plan formulated in Step ST604 and the cost required to supply energy, which is calculated in Step ST605, each satisfy the constraint condition. Herein, the constraint condition is the control target value set in Step ST601 and the demand forecast value outputted from the demand forecasting unit 143. Further, "to satisfy the constraint condition" means that the cost required to supply energy is not higher than the control target value or the amount of supply energy in accordance with the energy supply plan is not lower than the demand forecast value.

When both the energy supply plan and the cost required to supply energy satisfy the constraint condition, i.e., in the case corresponding to "YES" at the branch from Step ST606 exemplarily shown in FIG. 13, the process goes to Step ST607 exemplarily shown in FIG. 13. On the other hand, when either the energy supply plan or the cost required to supply energy does not satisfy the constraint condition, i.e., in the case corresponding to "NO" at the branch from Step ST606 exemplarily shown in FIG. 13, the process goes to Step ST608 exemplarily shown in FIG. 13.

In Step ST607, it is determined whether or not the cost required to supply energy is the lowest. Whether or not the cost required to supply energy is the lowest is determined by, for example, a method in which the cost calculation is repeatedly performed and at the point in time when the number of repetitions reaches a predetermined upper limit value of repeated calculation count, a search for the lowest value is made among the costs which have been calculated so far or a method in which when the calculated cost becomes lower than a predetermined cost target value, the cost is determined as the lowest one.

When the cost required to supply energy is the lowest, i.e., in the case corresponding to "YES" at the branch from Step ST607 exemplarily shown in FIG. 13, the process goes to Step ST609 exemplarily shown in FIG. 13. On the other hand, when the cost required to supply energy is not the lowest, i.e., in the case corresponding to "NO" at the branch from Step ST607 exemplarily shown in FIG. 13, the process goes to Step ST608 exemplarily shown in FIG. 13.

In Step ST608, changed is the amount of energy supplied from each energy equipment 2, which is set in Step ST604, or the amount of energy supplied from each energy equipment 2, which is changed in Step ST608. Then, the process goes back to Step ST604. The method of changing the amount of energy is a method based on, for example, general-type quadratic programming. Further, the method of changing the amount of energy is not limited to this method.

In Step ST609, the energy supply plan formulated in Step ST604 is outputted to the control command conversion unit 145.

Hardware Configuration of Energy Supply Plan Formulation Device

Figure 14:
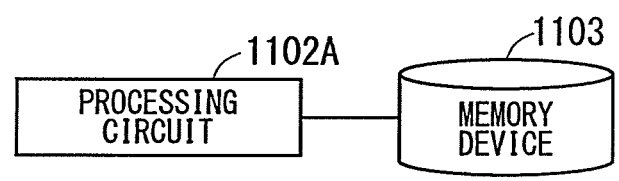
FIG. 14 is a view schematically illustrating a hardware configuration in a case of actually operating the energy supply plan formulation device exemplarily shown in FIGS. 2 and 5.

FIGS. 14 and 15 are views each schematically illustrating a hardware configuration in a case of actually operating the energy supply plan formulation device exemplarily shown in FIGS. 2 and 5.

Further, though there are some cases where the number of constituent elements or the like in the hardware configuration exemplarily shown in FIGS. 14 and 15 is not matched to that in the configuration exemplarily shown in FIGS. 2 and 5, this is because the constituent element exemplarily shown in FIGS. 2 and 5 represents a conceptual unit.

Therefore, there are at least possible cases where one constituent element exemplarily shown in FIGS. 2 and 5 consists of a plurality of hardware constituent elements exemplarily shown in FIGS. 14 and 15, where one constituent element exemplarily shown in FIGS. 2 and 5 corresponds to part of the hardware constituent element exemplarily shown in FIGS. 14 and 15, and where a plurality of constituent elements exemplarily shown in FIGS. 2 and 5 are included in one hardware constituent element exemplarily shown in FIGS. 14 and 15.

FIG. 14 shows a processing circuit 1102A for performing an arithmetic operation and a memory device 1103 for storing therein information, as the hardware configuration for implementing the respective functional units (the correction necessity determination unit 141, the parameter calculation unit 142, the demand forecasting unit 143, the supply plan formulation unit 144, and the control command conversion unit 145) of the arithmetic device 14 and the memory device 13, respectively, shown in FIGS. 2 and 5.

FIG. 15 shows a processing circuit 1102B for performing an arithmetic operation as the hardware configuration for implementing the respective functional units (the correction necessity determination unit 141, the parameter calculation unit 142, the demand forecasting unit 143, the supply plan formulation unit 144, and the control command conversion unit 145) of the arithmetic device 14 and the memory device 13 shown in FIGS. 2 and 5.

The memory device 13 is implemented by the memory device 1103 or any other memory device (herein not shown).

The memory device 1103 may be, for example, a memory (storage medium) including a hard disk drive (HDD), a volatile or nonvolatile semiconductor memory such as a random access memory (RAM), a read only memory (ROM), a flash memory, an erasable programmable read only memory (EPROM), an electrically erasable programmable read only memory (EEPROM), or the like, a magnetic disk, a flexible disk, an optical disk, a compact disk, a mini disk, a DVD (Digital Versatile Disc), or the like, or every storage medium which can be used in the future.

The processing circuit 1102A may execute a program stored in the memory device 1103, an external CD-ROM, an external DVD-ROM, an external flash memory, or the like. Specifically, the processing circuit 1102A may be, for example, a central processing unit (CPU), a microprocessor, a microcomputer, or a digital signal processor (DSP).

When the processing circuit 1102A executes a program stored in the memory device 1103, the external CD-ROM, the external DVD-ROM, the external flash memory, or the like, the arithmetic device 14 is implemented by software, firmware, or a combination of software and firmware where the program stored in the memory device 1103 is executed by the processing circuit 1102A. Further, the respective functional units (the correction necessity determination unit 141, the parameter calculation unit 142, the demand forecasting unit 143, the supply plan formulation unit 144, and the control command conversion unit 145) of the arithmetic device 14 may be implemented, for example, by a cooperation of a plurality of processing circuits.

The software and the firmware may be described as a program and stored in the memory device 1103. In that case, the processing circuit 1102A reads out and executes the program stored in the memory device 1103, to thereby implement the above-described function. In other words, the memory device 1103 may store therein the program which is executed by the processing circuit 1102A, to thereby consequently implement the above-described functions.

Further, the processing circuit 1102B may be a dedicated hardware. Specifically, the processing circuit 1102B may be, for example, a single circuit, a complex circuit, a programmed processor, a multiple (parallel) programmed processor, an integrated circuit (application specific integrated circuit (ASIC)), a field-programmable gate array (FPGA), or a combination of these circuits.

When the processing circuit 1102B is a dedicated hardware, the arithmetic device 14 is implemented by causing the processing circuit 1102B to operate. Further, the function of the arithmetic device 14 may be implemented by different circuits or by a single circuit.

Furthermore, some of the functions of the arithmetic device 14 may be implemented by the processing circuit 1102A which executes a program stored in the memory device 1103 and the others may be implemented by the processing circuit 1102B which is a dedicated hardware.

Effects Produced by the Above-Described Preferred Embodiment

Next, exemplary effects produced by the above-described preferred embodiment will be described. Further, in the following description, though the effects will be described on the basis of the specific configurations exemplarily shown in the above-described preferred embodiment, the configurations may be replaced by any other specific configuration exemplarily shown in the specification of the present application within the scope where the same effects can be produced.

According to the above-described preferred embodiment, the energy supply plan formulation device includes the acquisition unit, the determination unit 141c, the correction unit, the demand forecasting unit 143, and the supply plan formulation unit 144. Herein, the acquisition unit corresponds to, for example, the characteristic change acquisition unit 141b or the like. Further, the correction unit corresponds to, for example, the parameter calculation unit 142 or the like. Herein, the equipment model 144a is data indicating the equipment input/output characteristics of the corresponding energy equipment 2. Further, the load model 143a is a physical formula or an arithmetic operation method for forecasting the amount of energy demand of the corresponding energy supply target. Herein, the energy supply target is something that corresponds to, for example, a building 1000. Then, the characteristic change acquisition unit 141b acquires a change of the base load of the energy equipment 2. Further, the determination unit 141c determines whether to need correction of at least one of the equipment model 144a and the load model 143a on the basis of the change of the base load. Furthermore, the parameter calculation unit 142 corrects at least one of the equipment model 144a and the load model 143a on the basis of a determination result of the determination unit 141c. Further, the demand forecasting unit 143 forecasts the amount of energy demand of the building 1000. Furthermore, the supply plan formulation unit 144 formulates an energy supply plan on the basis of the equipment model 144a and the amount of energy demand.

Further, according to the above-described preferred embodiment, the energy supply plan formulation device includes the processing circuit 1102A for executing a program and the memory device 1103 for storing therein the program to be executed. Then, when the processing circuit 1102A executes the program, the following operation is thereby performed.

Specifically, the change of the base load of the energy equipment 2 is acquired. Then, it is determined whether to need correction of at least one of the equipment model 144a and the load model 143a on the basis of the change of the base load. Subsequently, on the basis of the determination result, corrected is at least one of the equipment model 144a and the load model 143a. Then, the amount of energy demand of the building 1000 is forecasted. Subsequently, on the basis of the equipment model 144a and the amount of energy demand, the energy supply plan is formulated.

Further, according to the above-described preferred embodiment, the energy supply plan formulation device includes the processing circuit 1102E which is a dedicated hardware. Then, the processing circuit 1102B which is a dedicated hardware performs the following operation.

Specifically, the processing circuit 1102B which is a dedicated hardware acquires a change of the base load of the energy equipment 2. Then, the processing circuit 1102B determines whether to need correction of at least one of the equipment model 144a and the load model 143a on the basis of the change of the base load. Subsequently, the processing circuit 1102B corrects at least one of the equipment model 144a and the load model 143a on the basis of the determination result. Then, the processing circuit 1102B forecasts the amount of energy demand of the building 1000. Subsequently, the processing circuit 1102B formulates the energy supply plan on the basis of the equipment model 144a and the amount of energy demand.

With such a configuration, it is possible to correct the model (at least one of the equipment model 144a and the load model 143a) in response to the change of the base load of the energy equipment 2 and further formulate the energy supply plan on the basis of the model. For this reason, even when there occurs a characteristic change accompanying a change of the equipment configuration or performance degradation of the energy equipment 2, it is possible to reduce the errors related to the energy supply plan. Further, since the energy supply is performed in accordance with the energy supply plan formulated with high accuracy, it is possible to reduce the cost for the energy supply in the cogeneration-type energy supply system and stably supply energy.

Further, when any other constituent element exemplarily shown in the specification of the present application is added to the above-described configuration as appropriate, in other words, even when any other constituent element which is not referred to as the above-described configuration and exemplarily shown in the specification of the present application is added as appropriate, the same effects can be produced.

Furthermore, according to the above-described preferred embodiment, the characteristic change acquisition unit 141b acquires a change of the base load on the basis of a difference between an operating value and a theoretical value at each time point, and the operating value is calculated on the basis of the supply energy achievement data 133 which is time-series data indicating an achievement related to energy supplied to the building 1000 and the consumption achievement data 134 which is time-series data indicating an achievement related to the energy consumption of the energy equipment 2 and the theoretical value is calculated on the basis of the environment data related to the internal and external environment of the building 1000 and the equipment operation achievement data which is time-series data indicating an achievement related to an operation state of the energy equipment 2. With such a configuration, it becomes possible to determine whether to need correction of not only the equipment characteristic value data 131 but also a parameter of any other model. The determination unit 141c can determine, for example, the magnitude of the forecast error of the load model 143a, and it becomes possible to determine whether to need correction of a parameter of the load model 143a.

Further, according to the above-described preferred embodiment, the characteristic change acquisition unit 141b extracts the base load at a plurality of time points by performing the frequency analysis of the supply energy achievement data 133 which is time-series data indicating an achievement related to the energy supplied to the building 1000, and further acquires a change of the base load on the basis of a difference among the extracted base loads. With such a configuration, it is possible to determine whether to need correction of the equipment model 144a in response to the change of the base load.

Furthermore, according to the above-described preferred embodiment, the parameter calculation unit 142 forecasts the amount of energy demand of the building 1000 a plurality of times by giving random variation to parameters of the equipment model 144a or parameters of the load model 143a on the basis of the supply energy achievement data 133, and corrects at least one of the equipment model 144a and the load model 143a by the random search method for searching for a parameter which causes a result closest to the supply energy achievement data 133 or a method using a regression equation with a parameter of the equipment model 144a or a parameter of the load model 143a used as an explanatory variable and with the energy to be supplied to the building 1000 used as a response variable. With such a configuration, by correcting the model, it is possible to formulate the energy supply plan on the basis of the corrected model. For this reason, even when there occurs a characteristic change accompanying a change of the equipment configuration or performance degradation of the energy equipment 2, it is possible to reduce the errors related to the energy supply plan.

Further, according to the above-described preferred embodiment, the demand forecasting unit 143 forecasts the amount of energy demand of the building 1000 on the basis of an average value of the energy supplied to the building 1000, which is calculated from the supply energy achievement data 133, or a heat load calculated from the load model 143a, the operational data (the equipment operation achievement data 136) of the energy equipment 2, and the indoors-and-outdoors environment data 135 related to the internal and external environment of the building 1000. With such a configuration, it is possible to formulate the energy supply plan which satisfies the amount of energy demand.

Furthermore, according to the above-described preferred embodiment, the supply plan formulation unit 144 formulates the energy supply plan by deriving a solution of the optimization problem for minimizing the cost required to supply energy to the building 1000 while satisfying the amount of energy demand. With such a configuration, it is possible to formulate the energy supply plan in which the cost required to supply energy to the building 1000 is suppressed.

Further, according to the above-described preferred embodiment, the energy equipment 2 includes at least one of the power supply equipment 21, the power transmission and reception equipment 22, the heat supply equipment 23, and the heat transmission and reception equipment 24. With such a configuration, it is possible to correct the model in response to the change of the base load of the energy equipment 2 and further formulate the energy supply plan on the basis of the model.

Furthermore, according to the above-described preferred embodiment, the equipment model 144a is represented as a graph or a table indicating the energy input/output characteristics of the corresponding energy equipment 2. With such a configuration, it is possible to correct the model in response to the change of the base load of the energy equipment 2 and further formulate the energy supply plan on the basis of the model.

According to the above-described preferred embodiment, in the energy supply plan formulation method, a change of the base load of the energy equipment 2 is acquired. Then, on the basis of the change of the base load, it is determined whether to need correction of at least one of the equipment model 144a and the load model 143a. Subsequently, on the basis of the determination result, at least one of the equipment model 144a and the load model 143a is corrected. Then, the amount of energy demand of the building 1000 is forecasted. Subsequently, on the basis of the equipment model 144a and the amount of energy demand, the energy supply plan is formulated.

With such a configuration, it is possible to correct the model (at least one of the equipment model 144a and the load model 143a) in response to the change of the base load of the energy equipment 2 and further formulate the energy supply plan on the basis of the model. For this reason, even when there occurs a characteristic change accompanying a change of the equipment configuration or performance degradation of the energy equipment 2, it is possible to reduce the errors related to the energy supply plan.

Furthermore, unless there is no particular limitation, the order of performing respective processes may be changed.

Further, when any other constituent element exemplarily shown in the specification of the present application is added to the above-described configuration as appropriate, in other words, even when any other constituent element which is not referred to as the above-described configuration and exemplarily shown in the specification of the present application is added as appropriate, the same effects can be produced.

Variations of the Above-Described Preferred Embodiment

In the preferred embodiment described above, the size, the shape, the relative arrangement relation, the implementation condition, or the like of each constituent element is described in some cases, but this is only one example in all aspects and not restrictive.

Therefore, an indefinite number of modifications, variations, and equivalents not exemplarily shown are assumed within the scope of the technique disclosed in the specification of the present application. These modifications, variations, and equivalents include, for example, exemplary cases where at least one constituent element is deformed, added, and/or omitted.

When a material name or the like is described, not being particularly specified, in the above-described preferred embodiment, the material includes the same containing any other additive, such as an alloy, as long as no contradiction arises.

Further, in the above-described preferred embodiment, when it is described that something comprises "a" constituent element, something may comprise "one or more" constituent elements, as long as no contradiction arises.

Furthermore, the description in the specification of the present application can be referred to for all purposes pertaining to the present technique, and is not recognized as the prior art.

Further, each constituent element described in the above-described preferred embodiment can be assumed as software or firmware, or as hardware corresponding thereto, and the constituent element is referred to as a "unit", a "processing circuit (circuitry)", or the like in both the concepts.

Furthermore, the technique disclosed in the specification of the present application may include a case where the constituent elements are dispersed in a plurality of devices, in other words, an aspect like a system as a combination of the plurality of devices.

Though the memory device 13 is included inside the energy supply plan formulation device in FIG. 2, for example, the memory device 13 may be an external functional unit. In that case, the whole of the other functional units inside the energy supply plan formulation device and the external functional unit which act on each other has only to perform the function of the energy supply plan formulation device.

EXPLANATION OF REFERENCE SIGNS

1 energy supply plan formulation device, 2 energy equipment, 3, 31, 32 sensor, 4 control network, 11 receiving device, 12 transmission device, 13, 1103 memory device, 14 arithmetic device, 21 power supply equipment, 22 power transmission and reception equipment, 23 heat supply equipment, 24 heat transmission and reception equipment, 131 equipment characteristic value data, 132 load model parameter, 133 supply energy achievement data, 134 consumption achievement data, 135 indoors-and-outdoors environment data, 136 equipment operation achievement data, 141 correction necessity determination unit, 141a factor analysis unit, 141b characteristic change acquisition unit, 141c determination unit, 142 parameter calculation unit, 143 demand forecasting unit, 143a load model, 144 supply plan formulation unit, 144a equipment model, 144b optimization engine, 145 control command conversion unit, 1000 building, 1102A, 1102B processing circuit

The invention claimed is:

1. An energy supply plan formulation device for formulating an energy supply plan to be used for controlling an operation of at least one energy equipment which inputs and/or outputs energy from/to an energy supply target, on the basis of an equipment model corresponding to the energy equipment and a load model corresponding to the energy supply target,
wherein the equipment model is data indicating energy input/output characteristics of the corresponding energy equipment, and
the load model is a physical formula or an arithmetic operation method used for forecasting the amount of energy demand of the corresponding energy supply target,
the energy supply plan formulation device comprising:
at least one processor to execute a program and
at least one memory to store the program which, when it is executed by the processor, causes the processor to be configured to:
acquire a change of a base load of the energy equipment through analysis of time-series operational data of the at least one energy equipment to detect a deviation in energy input/output characteristics;
determine whether to need correction of at least one of the equipment model and the load model on the basis of the change of the base load to maintain accuracy of the energy supply plan in response to the detected deviation;
correct at least one of the equipment model and the load model on the basis of a determination result to adjust the energy input/output characteristics or the physical formula based on the detected deviation;
forecast the amount of energy demand of the energy supply target using the corrected at least one of the equipment model and the load model; and
formulate an energy supply plan on the basis of the equipment model and the amount of energy demand; and
output the energy supply plan to control the operation of the at least one energy equipment to supply energy to the supply target; and
control the operation of the at least one energy equipment to supply energy to the energy supply target based on the energy supply plan.

2. The energy supply plan formulation device according to claim 1, wherein,
to acquire the change of the base load, the change of the base load is acquired on the basis of a difference between an operating value and a theoretical value at each time point, the operating value being calculated on the basis of supply energy achievement data which is time-series data indicating an achievement related to the energy supplied to the energy supply target and consumption achievement data which is time-series data indicating an achievement related to energy consumption of the energy equipment, the theoretical value being calculated on the basis of environment data related to an internal and external environment of the energy supply target and equipment operation achievement data which is time-series data indicating an achievement related to an operation state of the energy equipment.

3. The energy supply plan formulation device according to claim 1, wherein,
to acquire the change of the base load, the base load is extracted at a plurality of time points by performing frequency analysis of supply energy achievement data which is time-series data indicating an achievement related to the energy supplied to the energy supply target and further the change of the base load is acquired on the basis of a difference among the extracted base loads.

4. The energy supply plan formulation device according to claim 2, wherein,
to correct at least one of the equipment model and the load model, the amount of energy demand of the energy supply target is forecasted a plurality of times by giving random variation to parameters of the equipment model or parameters of the load model on the basis of the supply energy achievement data and at least one of the equipment model and the load model is corrected by a random search method for searching for a parameter which causes a result closest to the supply energy achievement data or a method using a regression equation where a parameter of the equipment model or a parameter of the load model is regarded as an explanatory variable and the energy supplied to the energy supply target is regarded as a response variable.

5. The energy supply plan formulation device according to claim 2, wherein,
to forecast the amount of energy demand of the energy supply target, the amount of energy demand of the energy supply target is forecasted on the basis of an average value of the energy supplied to the energy supply target, which is calculated from the supply energy achievement data, or a heat load calculated from the load model, operational data of the energy equipment, and the environment data related to the internal and external environment of the energy supply target.

6. The energy supply plan formulation device according to claim 1, wherein,
to formulate the energy supply plan, the energy supply plan is formulated by deriving a solution of an optimization problem for minimizing a cost required to supply the energy to the energy supply target while satisfying the amount of energy demand.

7. The energy supply plan formulation device according to claim 1, wherein
the energy equipment includes at least one of power supply equipment, power transmission and reception equipment, heat supply equipment, and heat transmission and reception equipment.

8. The energy supply plan formulation device according to claim 1, wherein
the equipment model is represented as a graph or a table indicating the energy input/output characteristics of the corresponding energy equipment.

9. The energy supply plan formulation device according to claim 1, wherein,
to acquire the change of the base load, the time-series operational data includes a cold/hot water inlet/outlet temperature and a cold/hot water flow rate of a chiller included in the at least one energy equipment, and the change of the base load is acquired by detecting a deviation in the cold/hot water flow rate from a baseline flow rate established by the equipment model.

10. The energy supply plan formulation device according to claim 1, wherein,
to correct at least one of the equipment model and the load model, a parameter of the equipment model representing a relationship between energy input and energy output of a heat transmission and reception equipment is corrected, based on the detected deviation in the base load, to reflect performance degradation of the heat transmission and reception equipment.

11. The energy supply plan formulation device according to claim 1, wherein,
to forecast the amount of energy demand, the load model incorporates a heat load calculation based on a difference between a target room temperature and an actual room temperature of the energy supply target, derived from the environment data, to account for thermal energy demand in a building.

12. The energy supply plan formulation device according to claim 1, wherein,
to formulate the energy supply plan, an operation schedule is specified for a plurality of energy equipment including at least a power supply equipment and a heat supply equipment, and the operation schedule is optimized to minimize a total energy cost while satisfying the forecasted amount of energy demand across both power and heat domains.

13. The energy supply plan formulation device according to claim 1, wherein the processor is further configured to:
convert the formulated energy supply plan into a control command executable by the at least one energy equipment, the control command adjusting an operational state of the at least one energy equipment to align energy output with the forecasted amount of energy demand.

14. An energy supply plan formulation method for formulating an energy supply plan to be used for controlling an operation of at least one energy equipment which inputs and/or outputs energy from/to an energy supply target, on the basis of an equipment model corresponding to the energy equipment and a load model corresponding to the energy supply target,
wherein the equipment model is data indicating energy input/output characteristics of the corresponding energy equipment, and
the load model is a physical formula or an arithmetic operation method used for forecasting the amount of energy demand of the corresponding energy supply target,
the energy supply plan formulation method comprising:
acquiring a change of a base load of the energy equipment by analyzing time-series operational data of the energy equipment to detect a deviation in energy input/output characteristics;
determining whether to need correction of at least one of the equipment model and the load model on the basis of the change of the base load to maintain accuracy of the energy supply plan in response to the detected deviation;
correcting at least one of the equipment model and the load model on the basis of a determination result to adjust the energy input/output characteristics or the physical formula based on the detected deviation;
forecasting the amount of energy demand of the energy supply target using the corrected at least one of the equipment model and the load model;
formulating an energy supply plan on the basis of the equipment model and the amount of energy demand; and
outputting the energy supply plan to control the operation of the at least one energy equipment to supply energy to the energy supply target; and
controlling the operation of the at least one energy equipment to supply energy to the energy supply target based on the energy supply plan.

15. The energy supply plan formulation method according to claim 14, wherein
the at least one energy equipment includes a storage battery and a heat storage tank, and
correcting at least one of the equipment model and the load model includes adjusting parameters of the equipment model to account for a change in storage capacity of the storage battery or the heat storage tank detected in the time-series operational data.

* * * * *